(12) United States Patent
Ishida et al.

(10) Patent No.: US 12,115,613 B2
(45) Date of Patent: Oct. 15, 2024

(54) MACHINING DIMENSION PREDICTION APPARATUS, MACHINING DIMENSION PREDICTION SYSTEM, MACHINING DIMENSION PREDICTION METHOD, AND RECORDING MEDIUM

(71) Applicant: Mitsubishi Electric Corporation, Tokyo (JP)

(72) Inventors: Tetsushi Ishida, Tokyo (JP); Takaaki Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/574,332

(22) PCT Filed: Aug. 30, 2021

(86) PCT No.: PCT/JP2021/031649
§ 371 (c)(1),
(2) Date: Dec. 27, 2023

(87) PCT Pub. No.: WO2023/031984
PCT Pub. Date: Mar. 9, 2023

(65) Prior Publication Data
US 2024/0269793 A1    Aug. 15, 2024

(51) Int. Cl.
*B23Q 17/20* (2006.01)
*B23Q 17/00* (2006.01)
*B23Q 17/09* (2006.01)
*G05B 19/4065* (2006.01)
*G05B 19/418* (2006.01)
*G05B 23/02* (2006.01)

(52) U.S. Cl.
CPC ......... *B23Q 17/20* (2013.01); *B23Q 17/0904* (2013.01); *G05B 19/41885* (2013.01);
(Continued)

(58) Field of Classification Search
CPC .............. G05B 15/02; G05B 19/41885; G05B 19/4065; G05B 23/0232; B23Q 17/20;
(Continued)

(56) References Cited

U.S. PATENT DOCUMENTS 11,048,215 B2 *  6/2021  Saitou .............. G05B 19/40938
11,826,865 B2 * 11/2023  Fukatsu ............. B23Q 17/0952
(Continued)

FOREIGN PATENT DOCUMENTS

EP    3629118 A1 *  4/2020 ......... G05B 23/0254
EP    4035829 A1     8/2022
(Continued)

OTHER PUBLICATIONS

International Search Report and Written Opinion mailed on Nov. 16, 2021, received for PCT Application PCT/JP2021/031649, filed on Aug. 30, 2021, 8 pages including English Translation.
(Continued)

*Primary Examiner* — Ronald D Hartman, Jr.
(74) *Attorney, Agent, or Firm* — XSENSUS LLP

(57) ABSTRACT

A machining dimension prediction apparatus includes a trend acquirer that acquires, for each workpiece, trend information indicating a trend of a state of a machining tool during a machining period of machining performed by the machining tool, a feature calculator that calculates, based on the trend information, a feature using the trend of the state in each of sections included in the machining period, a measurement value acquirer that acquires a measurement value of a dimension of each workpiece after being machined, a section specifier that specifies, as a specific section of the sections, a section including a calculated feature having a greatest degree of relevance to the measurement value, and a predictor that predicts, when a new-target workpiece is machined, a dimension of the new-target
(Continued)

workpiece after being machined based on the feature calculated using the trend of the state in the specific section.

20 Claims, 22 Drawing Sheets

(52) U.S. Cl.
CPC ........ *B23Q 17/008* (2013.01); *B23Q 17/0995* (2013.01); *G05B 19/4065* (2013.01); *G05B 23/0232* (2013.01)

(58) Field of Classification Search
CPC .............. B23Q 17/0904; B23Q 17/008; B23Q 17/0995
See application file for complete search history.

(56) References Cited

U.S. PATENT DOCUMENTS

2019/0369598 A1* 12/2019 Kubo ...................... G06N 7/01
2021/0174227 A1* 6/2021 Ogawa ...................... G06N 5/04
2021/0364482 A1* 11/2021 Wang ........................ G06N 3/08
2023/0004152 A1* 1/2023 Wunderlich ....... G05B 23/0229

FOREIGN PATENT DOCUMENTS

| | | |
|---|---|---|
| JP | 2020-061109 A | 4/2020 |
| JP | 2020-069600 A | 5/2020 |
| JP | 2020-123409 A | 8/2020 |
| JP | 2021-010980 A | 2/2021 |
| JP | 6833090 B2 | 2/2021 |
| JP | 2021-057030 A | 4/2021 |
| WO | WO-2019239606 A1 * 12/2019 ......... B23Q 17/0952 |

OTHER PUBLICATIONS

Zhang et al., "Fault Detection and Classification of Time Series Using Localized Matrix Profiles" In: 2019 IEEE International Conference on Prognostics and Health Management (ICPHM). IEEE, Jun. 29, 2019, 9 pages.
Decision to Grant mailed on Mar. 1, 2022, received for JP Application 2022-503591, 5 pages including English Translation.

* cited by examiner

FIG.9

| CALCULATION RESULTS OF FEATURES FOR WORKPIECE [40-01] | | | | |
|---|---|---|---|---|
| SECTION | FEATURE | | | |
| | MAXIMUM VALUE(F1) | MINIMUM VALUE(F2) | AVERAGE VALUE(F3) | MEDIAN VALUE(F4) |
| A1 | 31.2 | 29.8 | 30.0 | 30.0 |
| A2 | 31.1 | 29.7 | 29.9 | 30.0 |
| ⋮ | ⋮ | ⋮ | ⋮ | ⋮ |

| CALCULATION RESULTS OF FEATURES FOR WORKPIECE [40-02] | | | | |
|---|---|---|---|---|
| SECTION | FEATURE | | | |
| | MAXIMUM VALUE(F1) | MINIMUM VALUE(F2) | AVERAGE VALUE(F3) | MEDIAN VALUE(F4) |
| A1 | 31.5 | 29.9 | 30.1 | 30.0 |
| A2 | 31.2 | 29.9 | 30.0 | 30.1 |
| ⋮ | ⋮ | ⋮ | ⋮ | ⋮ |

| CALCULATION RESULTS OF DEGREES OF RELEVANCE (COEFFICIENTS OF CORRELATION) ||||| 
|---|---|---|---|---|
| SECTION | FEATURE ||||
| | MAXIMUM VALUE(F1) | MINIMUM VALUE(F2) | AVERAGE VALUE(F3) | MEDIAN VALUE(F4) |
| A1 | 0.05 | 0.12 | 0.04 | 0.12 |
| A2 | 0.18 | 0.11 | 0.09 | 0.13 |
| ⋮ | ⋮ | ⋮ | ⋮ | ⋮ |
| A5 | 0.63 | 0.66 | <u>0.88</u> | 0.78 |
| ⋮ | ⋮ | ⋮ | ⋮ | ⋮ |
| A14 | 0.67 | 0.73 | 0.89 | <u>0.90</u> |
| ⋮ | ⋮ | ⋮ | ⋮ | ⋮ |

FIG.16

CALCULATION RESULTS OF FEATURES FOR WORKPIECE [40-01]

| SECTION | FEATURE | | | |
|---|---|---|---|---|
| | MAXIMUM VALUE (F1) | MINIMUM VALUE (F2) | AVERAGE VALUE (F3) | MEDIAN VALUE (F4) |
| COMBINATION OF A1 AND A2 | 31.2 | 29.8 | 30.0 | 30.0 |
| COMBINATION OF A1 AND A3 | 31.1 | 29.7 | 29.9 | 30.0 |
| ⋮ | ⋮ | ⋮ | ⋮ | ⋮ |

CALCULATION RESULTS OF FEATURES FOR WORKPIECE [40-02]

| SECTION | FEATURE | | | |
|---|---|---|---|---|
| | MAXIMUM VALUE (F1) | MINIMUM VALUE (F2) | AVERAGE VALUE (F3) | MEDIAN VALUE (F4) |
| COMBINATION OF A1 AND A2 | 31.5 | 29.9 | 30.1 | 30.0 |
| COMBINATION OF A1 AND A3 | 31.2 | 29.9 | 30.0 | 30.1 |
| ⋮ | ⋮ | ⋮ | ⋮ | ⋮ |

⋮

MACHINING DIMENSION PREDICTION APPARATUS, MACHINING DIMENSION PREDICTION SYSTEM, MACHINING DIMENSION PREDICTION METHOD, AND RECORDING MEDIUM

CROSS-REFERENCE TO RELATED APPLICATION

This application is based on PCT filing PCT/JP2021/031649, filed Aug. 30, 2021, the entire contents of which are incorporated herein by reference.

TECHNICAL FIELD

The present disclosure relates to a machining dimension prediction apparatus, a machining dimension prediction system a machining dimension prediction method, and a program.

BACKGROUND ART

Manufacturing lines at factory automation (FA) sites often include processes for machining workpieces with machining tools. Machined workpieces may be inspected to determine whether the dimensions are within tolerances. However, inspecting all workpieces after machining is difficult and time-consuming. Thus, techniques have been developed for predicting machining dimensions (see, for example, Patent Literature 1).

Patent Literature 1 describes a technique for extracting features from information about the drive state of a machining tool collected in a predetermined machining section, and using the features to generate a prediction model for predicting the machining dimension. The prediction model can determine the machining quality or determine whether the machining has been performed normally, without measuring the machining dimension after machining.

CITATION LIST

Patent Literature

Patent Literature 1: Japanese Patent No. 6833090

Non Patent Literature

Non Patent Literature 1: ZHANG, Jing et al., Fault Detection and Classification of Time Series Using Localized Matrix Profiles. In: 2019 IEEE International Conference on Prognostics and Health Management (ICPHM) IEEE, 2019, p. 1-7.

SUMMARY OF INVENTION

Technical Problem

For uniform cutting with a cutting tool to form a straight groove having a uniform width, the technique described in Patent Literature 1 can predict the machining dimension with a small error from the actually measured machining dimension. For curving cutting or partial cutting, however, cutting is nonuniform at measurement positions due to, for example, the angle at which a cutting tool comes in contact with the machining surface or the performance of curve interpolation control performed by a numerical control (NC) machining tool. Thus, the features extracted from information collected in a predetermined machining section may insufficiently reflect the dimension of a portion measured in inspection after machining. When the prediction model is trained to predict the machining dimension based on the features described in Patent Literature 1, the prediction model may have a large error in the predicted machining dimension. Thus, more accurate prediction is awaited for the dimension of a workpiece machined by the machining tool.

In response to the above issue, an objective of the present disclosure is more accurate prediction of the dimension of a workpiece machined by a machining tool.

Solution to Problem

To achieve the above objective, a machining dimension prediction apparatus according to an aspect of the present disclosure includes trend acquisition men for acquiring, for each of a plurality of workpieces on which machining is performed, trend information indicating a trend of a state of a machining tool during a machining period from a start to an end of the machining performed by the machining tool, feature calculation means for calculating, based on the trend information, a feature using the trend of the state in each of a plurality of sections included in the machining period, measurement value acquisition means for acquiring a measurement value of a dimension of each of the plurality of workpieces after being machined, section specifying means for specifying, as a specific section of the plurality of sections, a section including a calculated feature having a greatest degree of relevance to the measurement value, and prediction means for predicting, when a new-target workpiece is machined, a dimension of the new-target workpiece after being machined based on the feature calculated using the trend of the state in the specific section.

Advantageous Effects of Invention

In the apparatus according to the above aspect of the present disclosure, the section specifying means specifies, as the specific section of the plurality of sections, the section including the calculated feature having the greatest degree of relevance to the measurement value. The prediction means predicts the dimension of the new-target workpiece after being machined based on the feature calculated using the trend of the state in the specific section. In other words, the dimension is predicted based on the feature in the section in the machining period that is most relevant to the actual dimension. This allows more accurate prediction of the dimension of the workpiece machined by the machining tool.

BRIEF DESCRIPTION OF DRAWINGS

FIG. 9 is a table illustrating example calculation of the features in Embodiment 1;

FIG. 10 is a table illustrating example calculation of a degree of relevance in Embodiment 1;

FIG. 16 is a table illustrating example calculation of the features in Embodiment 2;

DESCRIPTION OF EMBODIMENTS

Prediction of a machining dimension according to one or more embodiments of the present disclosure is described below in detail with reference to the drawings.

Embodiment 1

Figure 1:
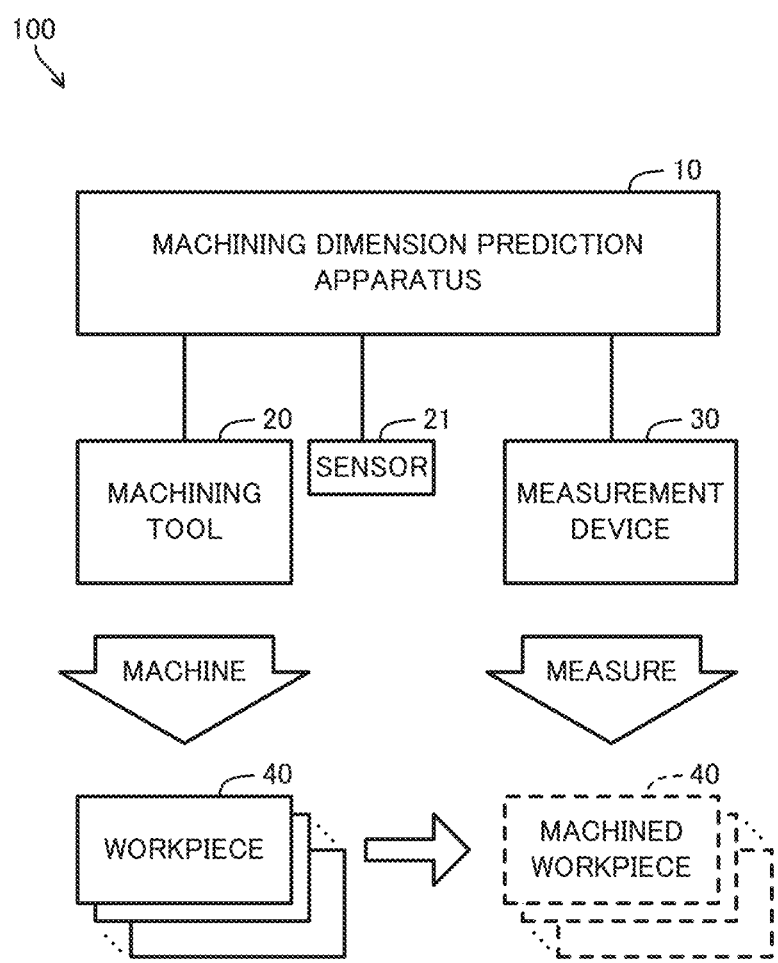
FIG. 1 is a block diagram of a machining dimension prediction system according to Embodiment 1.

As illustrated in FIG. 1, a machining dimension prediction apparatus 10 according to the present embodiment is included in a machining dimension prediction system 100, together with a machining tool 20 for machining a workpiece 40, a sensor 21 for measuring the state of the machining tool 20, and a measurement device 30 for acquiring coordinate information about the machining tool 20 and acquiring a measurement value of the dimension of the machined workpiece 40 for quality inspection. The machining dimension prediction system 100 is a part of a production system as a factory automation (FA) system installed at a factory. The machining dimension prediction system 100 can predict the machining dimension with higher accuracy by specifying information that particularly affects the machining dimension in information collected from the machining tool 20. The prediction performed by the machining dimension prediction system 100 refers to estimating the machining dimension without actually measuring the dimension.

The machining tool 20 is a numerical control (NC) machining tool, such as a milling machine, a lathe, a drilling machine, a machining center, or a turning center. The machining tool 20 executes a predesigned NC control program to machine the workpiece 40 using a tool. Examples of the tool include an end mill, a face mill, a drill, a tap, and a tip. The workpiece 40 is an object to be machined. Examples of machining include cutting, grinding, and chopping.

Figure 2:
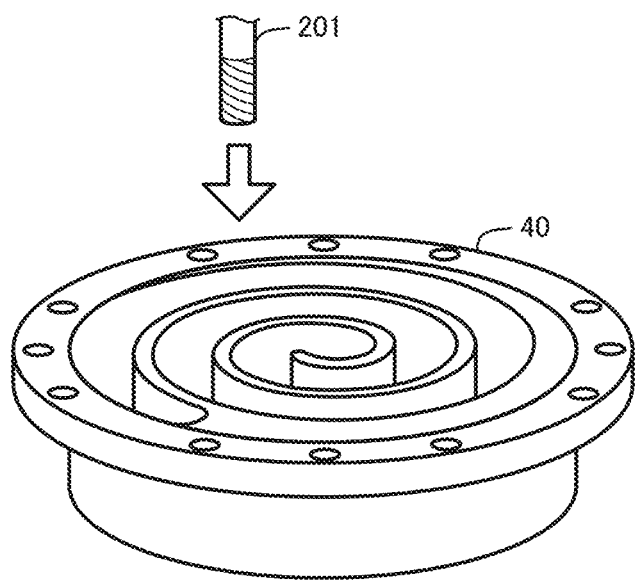
FIG. 2 is a diagram of a workpiece in Embodiment 1, illustrating example machining.
Figure 3:
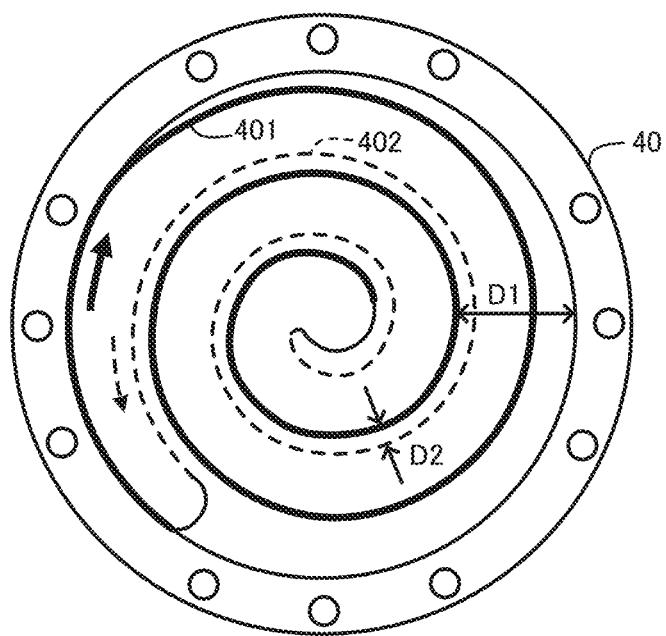
FIG. 3 is a diagram describing machining in Embodiment 1.

FIGS. 2 and 3 each illustrate example machining of the workpiece 40. In the example of FIG. 2, the machining tool 20 includes a tool 201 being an end mill that is placed in contact with the metal workpiece 40 as indicated by the arrow to cut the workpiece 40 and form a spiral-shaped vane. More specifically, the machining tool 20 includes the tool 201 that is moved in the direction of the thick arrow in FIG. 3 to form an inward-facing surface 401 indicated by the thick line, and then in the direction of the dashed arrow to form an outward-facing surface 402 indicated by the dashed line. The workpiece 40 machined in this manner is used as a component of a scroll compressor. The vane dimension of the scroll compressor is to be highly accurate. Thus, machining for the vane involves accurate prediction of the dimension.

The machining tool 20 is connected to the machining dimension prediction apparatus 10 with a communication line or with an analog signal line, and transmits, to the machining dimension prediction apparatus 10, state trend information indicating the trend of the state of the machining tool 20 acquired periodically with a built-in sensor. The trend of the state of the machining tool 20 reflects a change caused by machining in the wear state of the tool, the state of the workpiece 40, or the contact state between the tool and the workpiece 40. The state of the machining tool 20 is indicated by, for example, the value of torque or current flowing through a spindle motor for rotating the tool, the value of torque or current flowing through a motor of a feed shaft for a table to which the workpiece 40 is fastened, the coordinate values of the spindle or the table, or the temperature or the vibration intensity of the machining tool 20. The state trend information may be transmitted in real time during machining, or the results of measurement during machining may be transmitted together after machining.

The sensor 21 is a state-trend information collector for periodically collecting information about the state of the machining tool 20. The sensor 21 is retrofitted for an existing machining tool 20. In some embodiments, the sensor 21 may be incorporated in the machining tool 20 as a functional component as described above. The sensor 21 is connected to the machining dimension prediction apparatus 10 with a communication line or with an analog signal line and transmits the collected result to the machining dimension prediction apparatus 10. The result collected by the sensor 21 is assigned with an individual identification number, such as a manufacturing serial number corresponding to the individual workpiece 40. The machining dimension prediction apparatus 10 extracts, from the result collected by the sensor 21, information associated with machining performed by the machining tool 20 based on the individual identification number and on the progress of machining (state trend) notified by the machining tool 20.

The machining dimension prediction system 100 may eliminate either transmission of the result collected by the machining tool 20 or transmission of the result collected by the sensor 21. The machining dimension prediction system 100 may eliminate the sensor 21 when eliminating transmission of the measurement result from the sensor 21.

The measurement device 30 is connected to the machining dimension prediction apparatus 10 with a communication line. The measurement device 30 measures the dimension of the machined workpiece 40 and transmits, to the machining dimension prediction apparatus 10, the measurement result assigned with the individual identification number. Measurement performed by the measurement device 30 corresponds to the inspection process performed on the workpiece 40 after the machining process. The dimension to be measured by the measurement device 30 is typically the dimension of a portion of the workpiece 40 machined by the machining tool 20. In the example of FIG. 3, a length D1 and a length D2 are measurement targets. The length D1 is from the reference surface to a predetermined position on the inward-facing surface 401 of the vane. The length D2 corresponds to the thickness of a predetermined portion of the vane. The measurement targets are not limited to the example of FIG. 3. One measurement target or three or more measurement targets may be measured.

Figure 4:
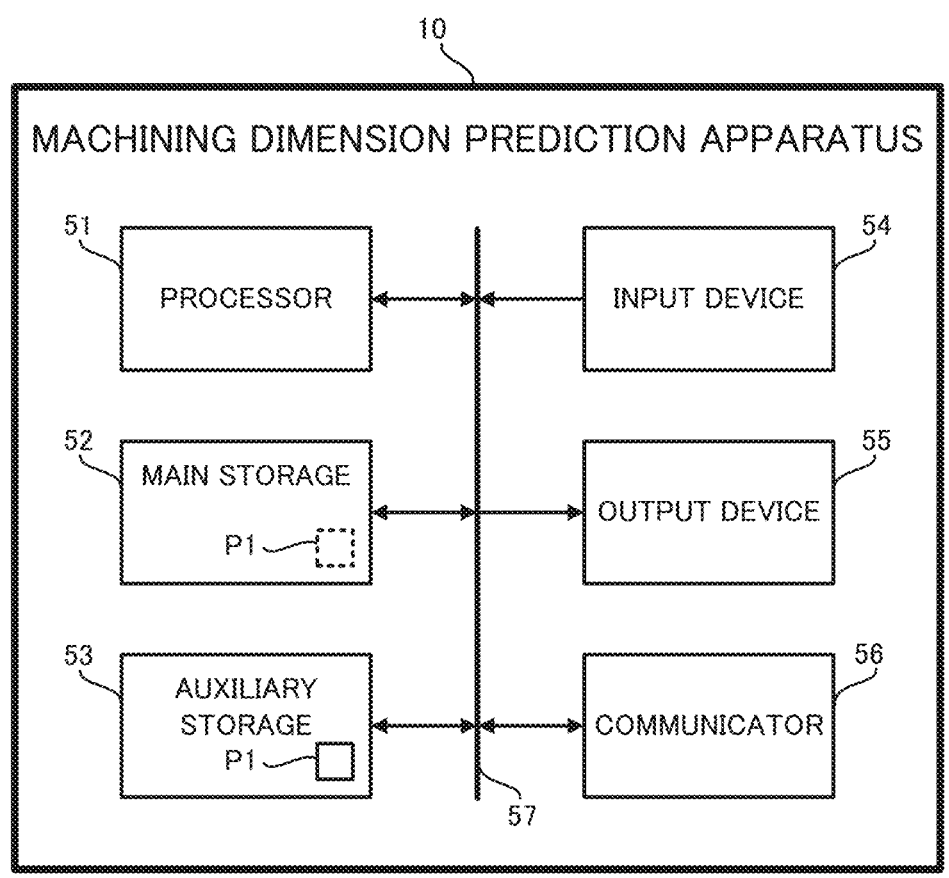
FIG. 4 is a block diagram of a machining dimension prediction apparatus according to Embodiment 1, illustrating the hardware configuration.

The machining dimension prediction apparatus 10 is, for example, an industrial personal computer (IPC), a programmable logic controller (PLC), or another FA apparatus. As illustrated in FIG. 4, the machining dimension prediction apparatus 10 includes, as hardware components, a processor 51, a main storage 52, an auxiliary storage 53, an input device 54, an output device 55, and a communicator 56. The main storage 52, the auxiliary storage 53, the input device 54, the output device 55, and the communicator 56 are connected to the processor 51 with an internal bus 57.

The processor 51 includes, as an integrated circuit, a central processing unit (CPU), a micro processing unit (MPU), a graphics processing unit (GPU) for computing, or a floating point unit (FPU). The processor 51 executes a program P1 stored in the auxiliary storage 53 to implement various functions of the machining dimension prediction apparatus 10 and perform processes described later.

The main storage 52 includes a random-access memory (RAM). The program P1 is loaded into the main storage 52 from the auxiliary storage 53. The main storage 52 is used as a work area for the processor 51.

The auxiliary storage 53 includes a nonvolatile memory, such as an electrically erasable programmable read-only memory (EEPROM). The auxiliary storage 53 stores, in addition to storing the program P1, various data items used for processing performed by the processor 51. The auxiliary storage 53 provides data usable by the processor 51 to the processor 51 as instructed by the processor 51, and stores data provided by the processor 51.

The input device 54 includes, for example, an input key, a button, a switch, a keyboard, a pointing device, or a digital input (DI) contact (photocoupler input). The input device 54 acquires information input into the machining dimension prediction apparatus 10 by the user or other information provided from an external device, and provides the acquired information to the processor 51.

The output device 55 includes, for example, a light-emitting diode (LED), a liquid crystal display (LCD), a digital output (DO) contact (photocoupler output), or a speaker. The output device 55 presents various items of information to the user or outputs such information to an external device as instructed by the processor 51.

The communicator 56 includes a network interface circuit for communicating with an external device, and an analog signal circuit. The communicator 56 receives a signal from an external device and outputs information indicated by the signal to the processor 51. The communicator 56 transmits a signal indicating information output from the processor 51 to an external device, or outputs an analog signal.

Figure 5:
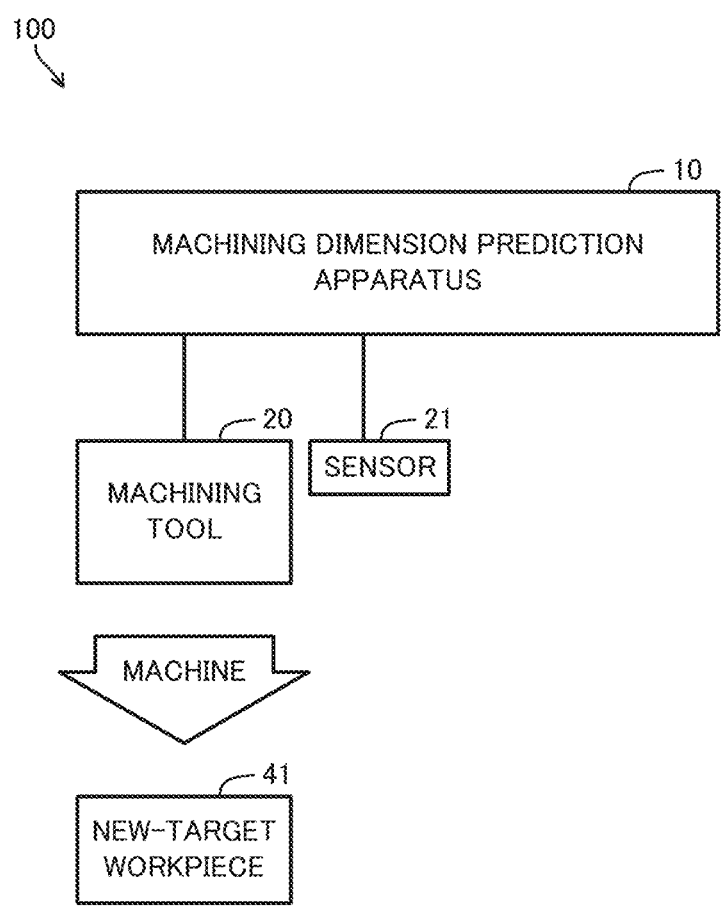
FIG. 5 is a block diagram of the machining dimension prediction apparatus according to Embodiment 1, describing prediction of a machining dimension.

The machining dimension prediction apparatus 10 includes the above hardware components cooperating with one another to perform training, for each of multiple workpieces 40, the relationship between the actual dimension value acquired from the measurement device 30 and the state trend of the machining tool 20 during machining acquired from the machining tool 20 and from the sensor 21. When a new-target workpiece 41 is machined, as illustrated in FIG. 5, the machining dimension prediction apparatus 10 predicts the machining dimension of the new-target workpiece 41 based on the state trend of the machining tool 20 notified by the machining tool 20 and by the sensor 21 and based on the relationship resulting from training.

Figure 6:
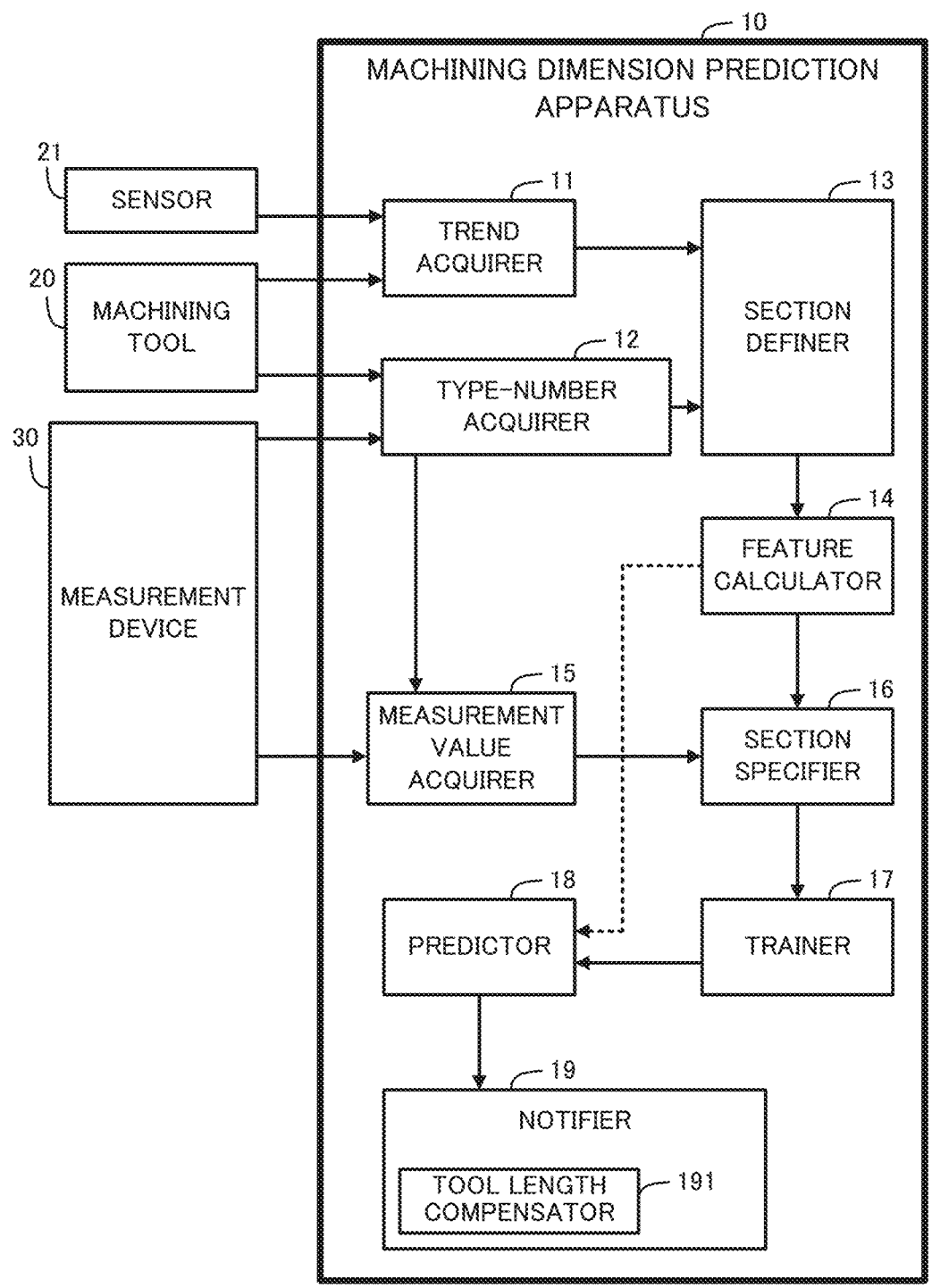
FIG. 6 is a functional block diagram of the machining dimension prediction apparatus according to Embodiment 1.

More specifically, as illustrated in FIG. 6, the machining dimension prediction apparatus 10 includes, as functional components, a trend acquirer 11 for acquiring trend information indicating the trend of the state of the machining tool 20 during the machining period from the start to the end of machining, a type-number acquirer 12 for acquiring the type and the manufacturing serial number of each of the workpieces 40 and 41, a section definer 13 for defining multiple sections based on the trend information acquired by the trend acquirer 11, a feature calculator 14 for calculating features using the trend of the state in each section defined by the section definer 13, a measurement value acquirer 15 for acquiring a measurement value of the dimension of each workpiece 40 after being machined, a section specifier 16 for specifying at least one section including the calculated feature highly relevant to the measurement value, a trainer 17 for training a prediction model to predict the dimension based on the feature in the specified section, a predictor 18 for predicting the dimension by inputting trend information about the new-target workpiece 41 into the prediction model, and a notifier 19 for notifying a result of determination as to whether the workpiece is acceptable based on the prediction result.

The trend acquirer 11 is mainly implemented by the communicator 56. The trend acquirer 11 acquires, for each of the workpieces 40 and 41 on which the same machining is performed, trend information from either the machining tool 20 or the sensor 21 or from both the machining tool 20 and the sensor 21. For example, the trend acquirer 11 acquires, as the trend of the state of the machining tool 20, trend information indicating the time-series waveform of the machining torque indicated by line L1 in FIG. 7. The machining torque corresponds to the current value of the spindle motor of the machining tool 20. The trend acquirer 11 in the machining dimension prediction apparatus 10 corresponds to an example of trend acquisition means for acquiring trend information indicating the trend of the state of the machining tool 20 during the machining period from the start to the end of machining performed by the machining tool 20 for each workpiece 40 on which machining is performed.

The type-number acquirer 12 is mainly implemented by the communicator 56. The type-number acquirer 12 acquires type information and the manufacturing serial number of each of the workpieces 40 and 41 from the machining tool 20 and the measurement device 30. The type-number acquirer 12 outputs the acquired type information and the acquired manufacturing serial number to the section definer 13 and the measurement value acquirer 15. The workpieces 40 and 41 on which the same machining is performed have the same type. The type information is used to distinguish the workpieces 40 and 41 on which the same machining is performed from workpieces on which other machining is performed. The manufacturing serial number is used to identify each of the individual workpieces 40 and 41.

The section definer 13 divides the machining period in the acquired trend information into multiple sections under a trend-information definition condition that is preliminarily associated with the type information, and outputs the sections to the feature calculator 14. The section definer 13 also divides the trend information about the new-target workpiece 41 into multiple sections under the trend-information definition condition that is preliminarily associated with the type information, and outputs the sections to the feature calculator 14.

The machining period may not correspond to the entire machining process for each of the workpieces 40 and 41. For example, when the machining process for each of the workpieces 40 and 41 includes a process for roughing, a process for forming the inward-facing surface 401 and the outward-facing surface 402 using the tool 201, and a process for forming threaded holes using another tool, the above machining period may correspond to the process for forming the inward-facing surface 401 and the outward-facing surface 402. The machining period may include the timing at which the portions of the workpieces 40 and 41 to be measured by the measurement device 30 are machined.

Figure 7:
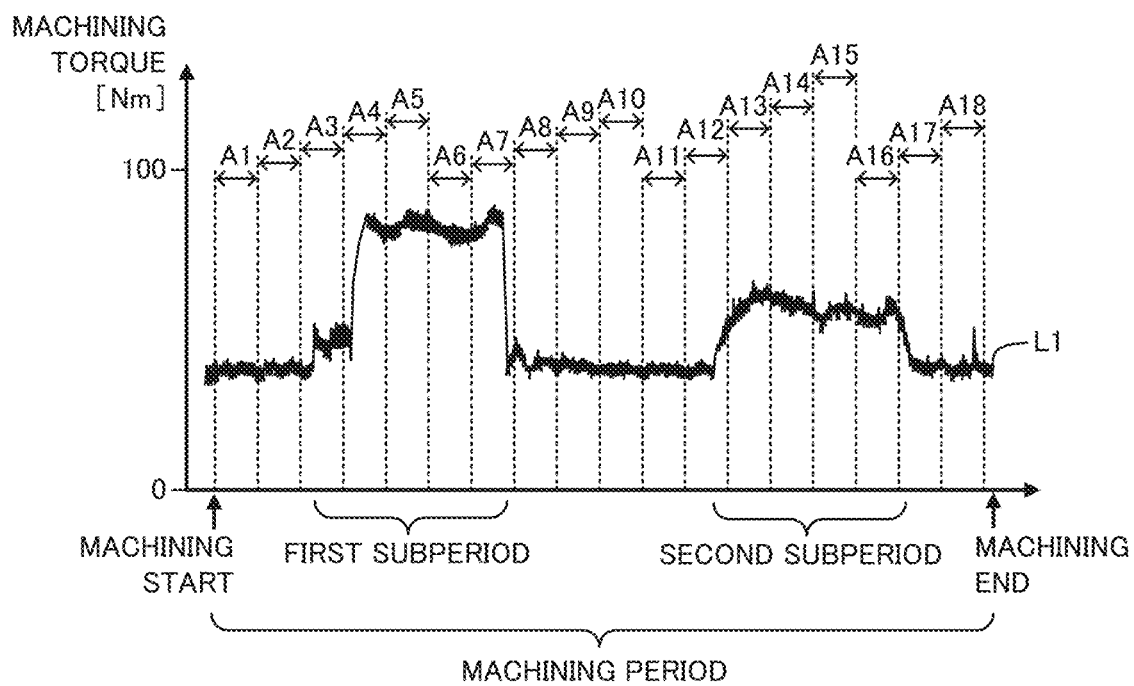
FIG. 7 is a graph illustrating an example trend of the state of a machining tool in Embodiment 1.

For example, as illustrated in the example of FIG. 7, the section definer 13 defines multiple sections A1 to A18 included in the machining period. The sections A1 to A18 include the section A1 of a period preset by the user from the start of machining, and the subsequent sections A2 to A18 each defined by repeatedly shifting the section A1 by a predetermined shift width. Although the shift width is equal to the length of each section in the example of FIG. 7, the shift width may be shorter or longer than the length of each section. The final section A18 may have the length changed to be included in the machining period. The sections are commonly set for the multiple workpieces 40 of the same type.

Figure 8:
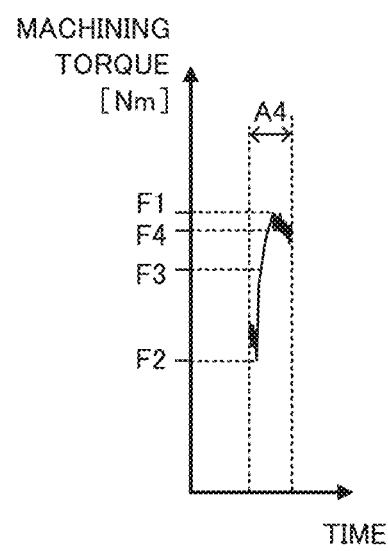
FIG. 8 is a graph describing calculation of features in Embodiment 1.

The feature calculator 14 is mainly implemented by the processor 51. The feature calculator 14 calculates multiple types of features using the trend of the state of the machining tool 20 in each section. For example, as illustrated in FIG. 8, the feature calculator 14 calculates, as the features of the waveform in the section A4, a feature F1 being the maximum value, a feature F2 being the minimum value, a feature F3 being the average value, and a feature F4 being the median value.

FIG. 9 is an example table including multiple types of features calculated for each section included in the machining period for the multiple workpieces 40. In FIG. 9, a first workpiece 40 is identified by an identifier 40-01, and a second workpiece 40 is identified by an identifier 40-02. Referring back to FIG. 6, the feature calculator 14 outputs the features calculated for the multiple workpieces 40 to the section specifier 16. The feature calculator 14 also outputs the features calculated for the new-target workpiece 41 to the predictor 18. The feature calculator 14 in the machining dimension prediction apparatus 10 corresponds to an example of feature calculation means for calculating the features using the trend of the state in each section included in the machining period based on the trend information acquired for each workpiece.

The measurement value acquirer 15 is mainly implemented by the communicator 56. The measurement value acquirer 15 acquires, from the measurement device 30, the measurement value of the dimension of each workpiece 40 after being machined. The measurement value acquirer 15 also acquires, from the type-number acquirer 12, the type information and the manufacturing serial number. The measurement value acquirer 15 outputs the measurement value acquired for each workpiece 40 to the section specifier 16. The measurement value acquirer 15 in the machining dimension prediction apparatus 10 corresponds to an example of measurement value acquisition means for acquiring the measurement value of the dimension of each workpiece 40 after being machined.

The section specifier 16 is mainly implemented by the processor 51. The section specifier 16 specifies, in descending order of the degree of relevance to the measurement value, multiple combinations of the types of features and the sections including the features calculated. The degree of relevance is an index value indicating the degree to which the calculated feature is relevant to the measurement value of the machining dimension for each workpiece 40. The degree of relevance is, for example, equal to the coefficient of correlation. FIG. 10 is an example table including coefficients of correlation, as degrees of relevance, between the measurement value and multiple types of features calculated using the trend of the state in each section. In the example of FIG. 10, two combinations, or specifically the combination of the section A14 and the feature F4 and the combination of the section A5 and the feature F3, are specified in descending order of the degree of relevance and illustrated in bold. Each coefficient of correlation is a real number ranging from −1 to 1. A greater coefficient of correlation, or specifically a coefficient of correlation with a greater absolute value, is more relevant to the measurement value.

The number of combinations specified by the section specifier 16 is preset by the user. For example, the inward-facing surface 401 in FIG. 3 is formed in a first subperiod in FIG. 7, and the outward-facing surface 402 in FIG. 3 is formed in a second subperiod in FIG. 7. When the length D2 in FIG. 3 is the measurement target to be measured by the measurement device 30, the sections with particularly great degrees of relevance to the measurement value are sections in the first subperiod in which the measurement target portion is machined and sections in the second subperiod in which the measurement target portion is machined. Thus, when the length D2 is the measurement target, two sections may be specified. In this case, the user may set the number of combinations of sections and features to be specified to two or more. When the length D2 alone is the measurement target, the user may set the number of combinations to be specified to two.

When a combination of a section and a feature is specified, combinations of the same section and other features may be excluded from combinations to be specified. More specifically, when the combination of the section A14 and the feature F4 is specified as illustrated in FIG. 10, a combination of another section and any feature may be specified, rather than the combination of the same section A14 and the feature F3.

When the length D1 in FIG. 3 is the measurement target, a single section in which the measurement target portion corresponding to the length D1 is machined has particularly a great degree of relevance to the measurement value. Thus, when the length D1 alone is the measurement target, the user may set the number of combinations to be specified to one. In other words, the section specifier 16 may specify at least one combination having the greatest degree of relevance.

In the example described above, the number of combinations specified by the section specifier 16 is equal to the number of sections including the timings of machining on the portion to be measured by the measurement device 30. However, these numbers may be different from each other. When the lengths D1 and D2 in FIG. 3 are both the measurement targets, for example, the section specifier 16 may specify fewer than three or more than three combinations.

The number of combinations specified by the section specifier 16 may not be preset. For example, the section specifier 16 may specify all the combinations having the degrees of relevance calculated to be greater than a predetermined threshold value. Any combination including a feature having the second greatest degree of relevance or less for a specific section may be excluded from all the combinations having the degrees of relevance calculated to be greater than the predetermined threshold value.

The section specifier 16 outputs the specified combinations, the features in the specified sections, and the measurement value to the trainer 17. The section specifier 16 in the machining dimension prediction apparatus 10 corresponds to an example of section specifying means for specifying, as a specific section of the multiple sections, the section including the calculated feature having the greatest degree of relevance to the measurement value.

Figure 11:
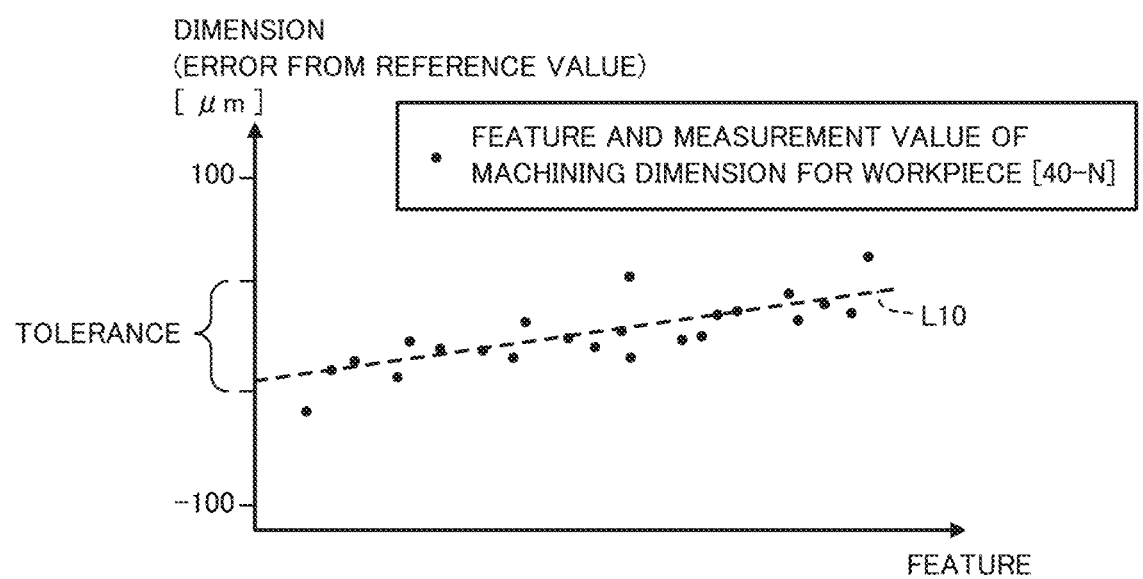
FIG. 11 is a graph illustrating an example prediction model in Embodiment 1.

The trainer 17 is mainly implemented by the processor 51. The trainer 17 trains the prediction model for predicting the machining dimension based on the features in the section specified by the section specifier 16 using the relationship between the features in the section and the measurement value of the machining dimension for each workpiece 40. For one combination specified by the section specifier 16, for example, the trainer 17 trains a regression line L10 illustrated in FIG. 11 as the prediction model. For two combinations specified by the section specifier 16 as illustrated in FIG. 10, the trainer 17 trains the prediction model expressed by regression equation (1) below.

$$B = C1 \cdot F3A5 + C2F4A14 + C3 \quad (1)$$

In the above equation. B is the predicted value of the machining dimension, C1 is a first coefficient, F3A5 is the feature F3 in the section A5, C2 is a second coefficient, F4A14 is the feature F4 in the section A14, and C3 is a constant term. Thus, the trainer 17 trains the prediction model by regression analysis. The trainer 17 outputs the trained prediction model to the predictor 18. The prediction model corresponds to an example of a second prediction model to predict the dimension of the workpiece 40 based on the feature corresponding to the specific section. The trainer 17 in the machining dimension prediction apparatus 10 corresponds to an example of training means for training the second prediction model.

The predictor 18 acquires, from the feature calculator 14, the features calculated using the trend information about the new-target workpiece 41, and inputs, of the acquired features, the features in the section specified by the section specifier 16 into the trained prediction model to estimate the dimension of the new-target workpiece 41. For example, the predictor 18 acquires, as the predicted value, the machining dimension value corresponding to the feature of the new-target workpiece 41 on the regression line L10 in FIG. 11. The predictor 18 substitutes the value of F3A5 and the value of F4A14 of the new-target workpiece 41 into the above regression equation (1) to acquire the predicted value B of the machining dimension. The predictor 18 then outputs the prediction result about the machining dimension to the notifier 19. The predictor 18 in the machining dimension prediction apparatus 10 corresponds to an example of prediction means for predicting the dimension of the new-target workpiece 41 after being machined based on the feature calculated using the trend of the state in the specific section. More specifically, the predictor 18 corresponds to an example of prediction means for predicting the dimension of the new-target workpiece 41 after being machined based on the feature of the type specified by the section specifying means and calculated using the trend of the state in the specific section specified by the section specifying means together with the type of feature.

The notifier 19 is implemented mainly by the output device 55. The notifier 19 determines whether the new-target workpiece 41 is acceptable by determining whether the predicted value of the machining dimension predicted by the predictor 18 is out of a predetermined tolerance. When the predicted value is determined to be out of the tolerance, the notifier 19 notifies the user that the machining is defective. The notifier 19 may provide the notification by displaying information on a screen on the machining dimension prediction apparatus 10, lighting an LED, or generating a buzzer sound. The notifier 19 may notify the machining tool 20 that the machining is defective and cause machining to stop with an alarm indication for the machining tool 20. The notifier 19 may compensate for the tool length (coordinates) to cause the predicted dimension value to be within the tolerance.

Tool length compensation refers to compensating for, for example, the coordinates of the tool and the coordinates of the table based on a change in the tool length caused by wear to improve contact between the tool and the workpiece 41 in subsequent machining for the workpiece 41 to be determined acceptable. The notifier 19 may include a tool length compensator 191 to perform tool length compensation. The tool length compensator 191 corresponds to an example of compensation means for compensating for, when the dimension predicted by the prediction means is out of the tolerance, the tool length set for the machining tool to machine the workpiece. The tool length compensator 191 may be located outside the notifier 19, or the tool length compensator 191 replaces the notifier 19 in the machining dimension prediction apparatus 10.

The notifier 19 may also notify the result of prediction performed by the predictor 18. More specifically, the notifier 19 may display information indicating the predicted value on the screen. The notifier 19 in the machining dimension prediction apparatus 10 corresponds to an example of notification means for providing a notification indicating that the dimension predicted by the prediction means is out of the predetermined tolerance.

The notifier 19 may also store the measurement values of the machining dimensions of the workpieces 40 and the predicted values of the machining dimensions of the new-target workpieces 41. Based on such history of the machining dimension, the notifier 19 may notify the prediction result about the number of times of machining expected to be performed before the machining dimension falls out of the tolerance due to the cutting tool length changed by wear. As the tool wears and deteriorates through machining performed many times, the machining dimension can typically have a greater error from the design value. This allows sufficiently accurate prediction of the number of times of machining expected to be performed before the machining dimension falls out of the tolerance. For example, the notifier 19 may perform regression analysis to predict the expected machining dimension based on the history of the machining dimension or to predict the expected error magnitude based on the history of the error in the machining dimension. The notification may include the number of times of machining to be performed or may include the length of time before the number of times of machining to be performed reaches zero. The notifier 19 may provide information about the number of times of machining to be performed.

Figure 12:
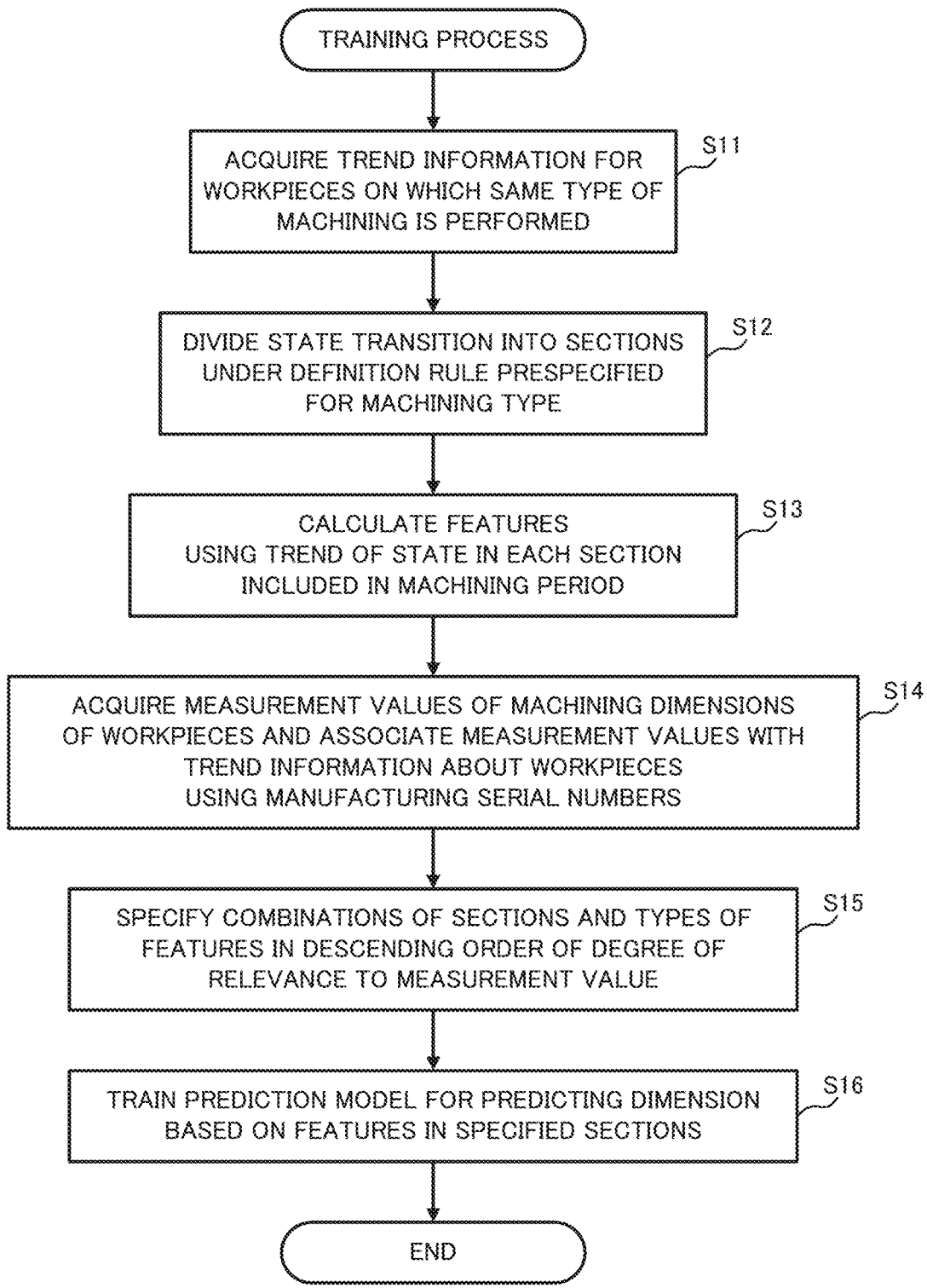
FIG. 12 is a flowchart of a training process in Embodiment 1.
Figure 13:
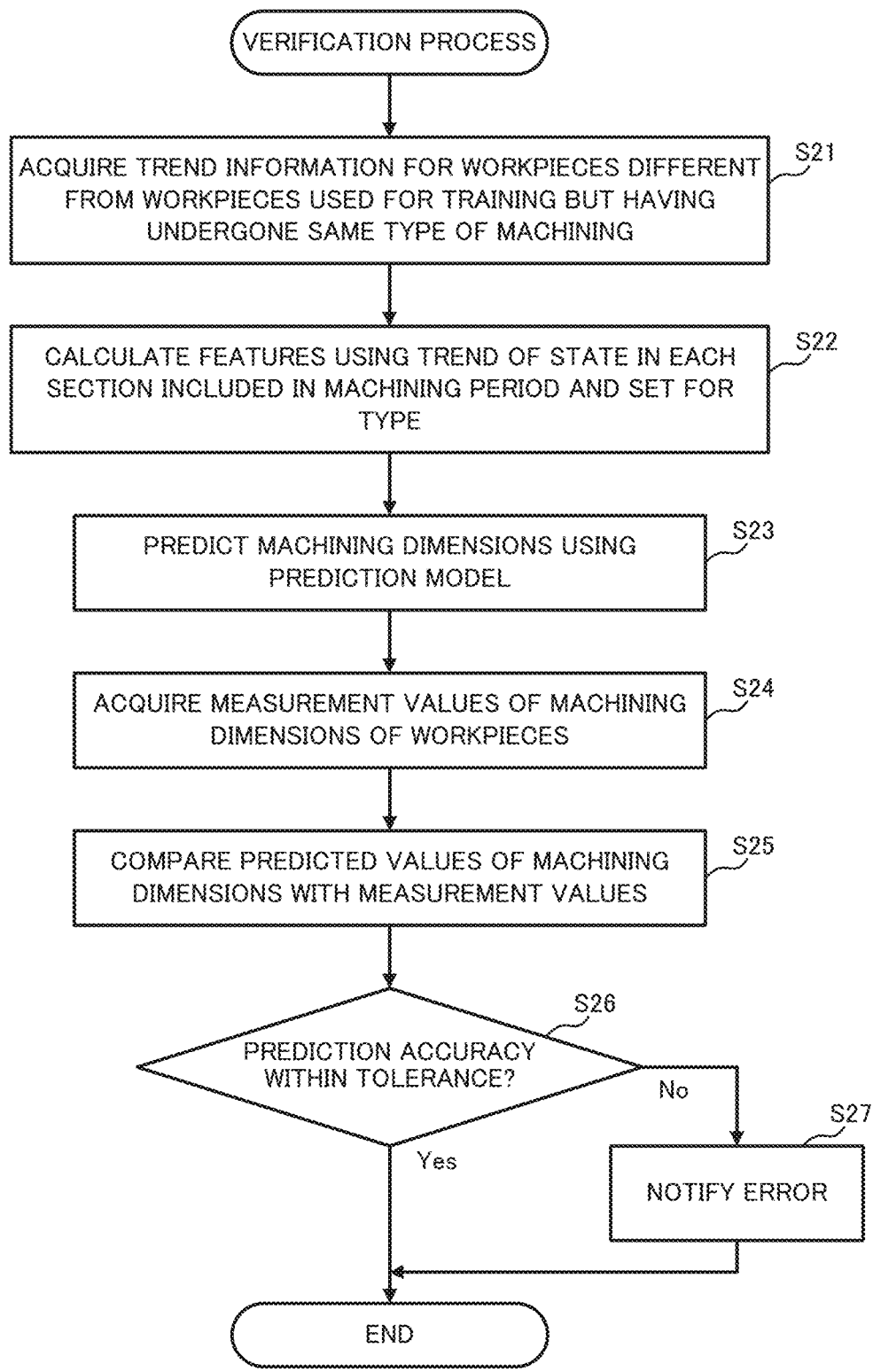
FIG. 13 is a flowchart of a verification process in Embodiment 1.
Figure 14:
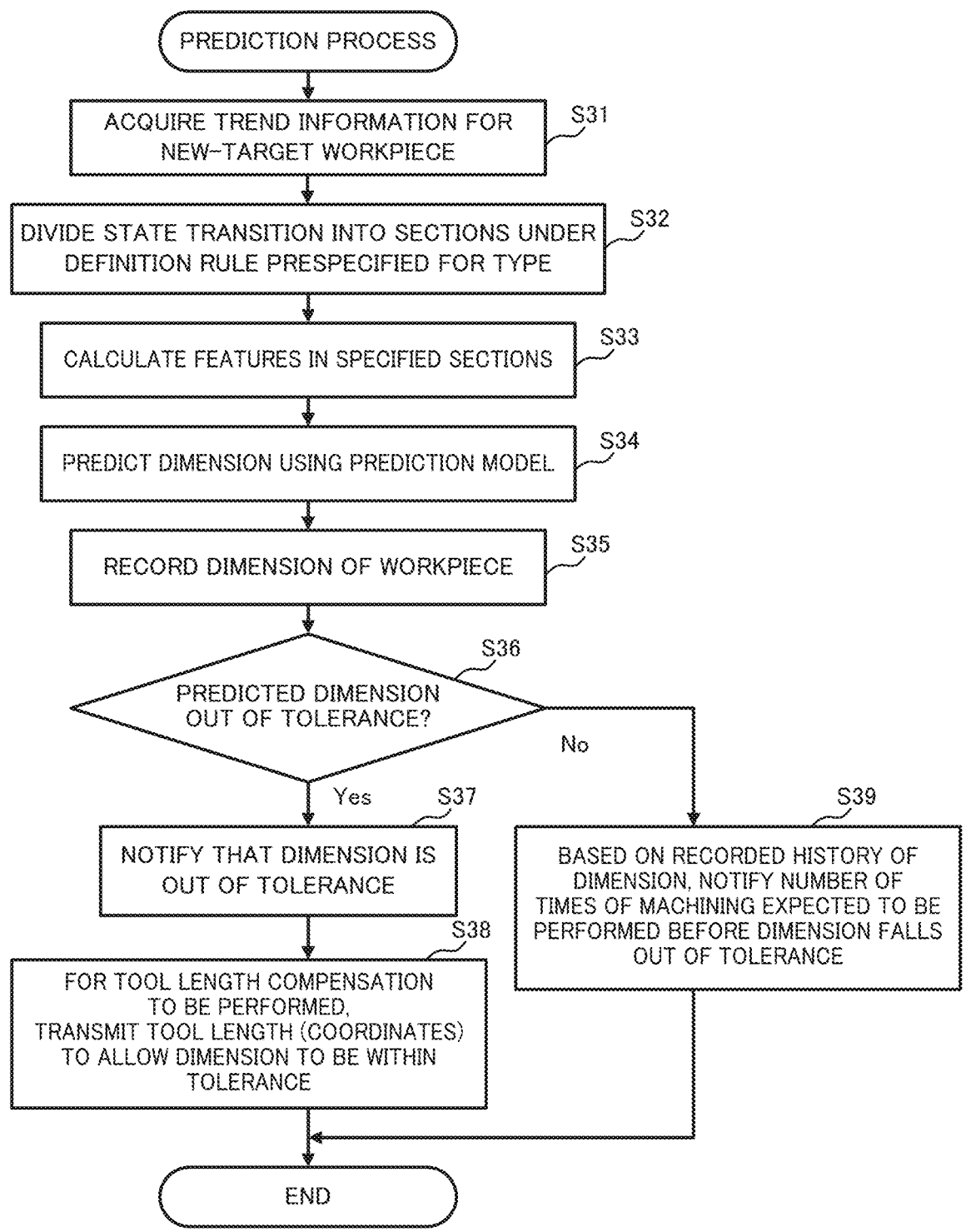
FIG. 14 is a flowchart of a prediction process in Embodiment 1.

FIGS. 12, 13, and 14 are flowcharts respectively illustrating a training process, a verification process, and a prediction process performed by the machining dimension prediction apparatus 10.

The training process in FIG. 12 is the training of the prediction model that starts when a specific application installed in the machining dimension prediction apparatus 10 is started by the user. In the training process, the trend acquirer 11 20 acquires trend information for each workpiece 40 on which the same type of machining is performed (step S11). The section definer 13 divides the state transition indicated by the trend information into multiple sections under a definition rule prespecified for the machining type (step S12). The feature calculator 14 then calculates the features using the trend of the state in each section included in the machining period (step S13).

The measurement value acquirer 15 then acquires the measurement values of the machining dimensions of the multiple workpieces 40 for which trend information is acquired in step S11, and associates the measurement values with the trend information about the workpieces 40 acquired in step S11 using the manufacturing serial numbers (step S14). The section specifier 16 specifies multiple combinations of the sections and the types of features calculated in step S13 in descending order of the degree of relevance to each measurement value acquired in step S14 (step S15). The trainer 17 then trains the prediction model for predicting the machining dimension based on the features in the sections specified in step S15 (step S16). The training process thus ends.

The verification process illustrated in FIG. 13 is the verification of the prediction accuracy with the prediction model trained in the training process. In the verification process, the trend acquirer 11 acquires trend information for multiple workpieces 40 different from the workpieces 40 used for data collection in step S11 in the training process but having undergone the same type of machining as these workpieces 40 (step S21).

The feature calculator 14 then calculates, based on the trend information acquired in step S21, the features using the trend of the state in each section included in the machining period and set for the type (step S22). The predictor 18 predicts the machining dimensions based on the features calculated in step S22 using the prediction model trained in the training process (step S23).

The measurement value acquirer 15 then acquires the measurement values of the machining dimensions of the multiple workpieces 40 for which trend information is acquired in step S21 (step S24). The predictor 18 compares the predicted values of the machining dimensions acquired in step S23 with the measurement values acquired in step S24 (step S25). For example, the predictor 18 records the residuals between the predicted values and measurement values.

The predictor 18 then determines whether the prediction accuracy acquired in step S25 is within the predetermined tolerance (step S26). In step S26, the determination may be performed as to whether the adjusted coefficients of determination acquired based on the dimension values predicted for the multiple machining operations and the measurement values of the workpieces 40 are within the tolerance. When the prediction accuracy is determined to be out of the tolerance (No in step S26), the notifier 19 notifies the user of an error indicating that the resulting prediction model has insufficient prediction accuracy (step S27). This prompts the user to provide an instruction to perform the training process again using, for example, new training target data. The prediction model can thus be retrained to have sufficient prediction accuracy. When the prediction accuracy is determined to be within the tolerance (Yes in step S26), or after step S27 is performed, the verification process ends.

The prediction process illustrated in FIG. 14 is the prediction of the machining dimension of the new-target workpiece 41 using the prediction model. In the prediction process, the trend acquirer 11 acquires trend information for the new-target workpiece 41 (step S31). The section definer 13 divides the state transition indicated by the trend information acquired in step S31 into multiple sections under a definition rule prespecified for the type (step S32). The feature calculator 14 calculates the features in, 15 of the sections resulting from the division in step S32, the sections specified in step S15 in the training process (step S33).

The predictor 18 then predicts the machining dimension of the new-target workpiece 41 using the prediction model that has been verified to have sufficient prediction accuracy in the verification process (step S34). The notifier 19 acquires and records the predicted dimension of the new-target workpiece 41 (step S35). The notifier 19 may also record the measurement values of the workpieces 40 used for the training process and the measurement values of the workpieces 40 used for the verification process.

The notifier 19 then determines whether the dimension predicted in step S34 is out of the tolerance (step S36). When the dimension is determined to be out of the tolerance (Yes in step S36), the notifier 19 notifies the user of the determination result (step S37). For tool length compensation to be performed, the tool length (coordinates) is transmitted to the machining tool 20 to allow the workpiece 41 to have a dimension within the tolerance in subsequent machining (step S38). When the dimension is determined to be within the tolerance (No in step S36), the notifier 19 notifies, based on the recorded history of the dimension, the number of times of machining expected to be performed before the dimension falls out of the tolerance (step S39). The prediction process then ends.

As described above, the section specifier 16 specifies, of multiple sections, the section including the calculated feature having the greatest degree of relevance. The predictor 18 predicts the dimension of the new-target workpiece 41 after being machined based on the feature calculated using the trend of the state in the section specified by the section specifier 16. In other words, the machining dimension is predicted based on the feature in the section in the machining period that is most relevant to the actual dimension. This allows more accurate prediction of the dimension of the new-target workpiece 41 machined by the machining tool 20.

To increase the prediction accuracy being low, known techniques train the prediction model by manually changing the section for calculating the features or manually changing the types of features. In contrast, the machining dimension prediction apparatus 10 according to the present embodiment collects and registers a sufficient volume of time-series data in the machining period and the dimensions measured after the machining for workpieces of the same type on which the machining is performed under the same machining conditions. This allows accurate training of the prediction model and determination as to whether the new-target workpiece 41 is acceptable based on the value predicted with the prediction model.

The section specifier 16 specifies two or more sections in descending order of the degree of relevance. This allows accurate prediction of the machining dimension of the new-target workpiece 41 when two or more portions of the workpiece 40 machined by the machining tool 20 are to be measured by the measurement device 30. The use of more parameters can typically increase the prediction accuracy.

The section specifier 16 specifies the type of feature having a great degree of relevance to the measurement value, in addition to specifying the section having a great degree of relevance to the measurement value. The predictor 18 measures the machining dimension of the new-target workpiece 41 based on the feature of the specified type. This allows highly accurate prediction of the machining dimension based on the feature of the appropriate type.

The section specifier 16 specifies the section having the greatest coefficient of correlation with the measurement value as the section having the greatest degree of relevance. The coefficients of correlation can be calculated with a relatively light computational load. The structure can thus reduce the computational load for specifying the section. The structure can reduce the computational load particularly when more sections and more types of features are used and when the section specifier 16 searches a wider range to specify the combination of the section and the type of feature.

The feature calculator 14 calculates the feature for every shifting of a section with a predetermined length within the machining period. This structure can reduce the computational load for calculating the features.

The machining dimension prediction apparatus 10 includes the trainer 17 for training the prediction model. This allows accurate estimation of the machining dimension using the prediction model acquired with a large volume of data.

The machining dimension prediction apparatus 10 includes the notifier 19 for providing a notification indicating that the predicted machining dimension is out of the tolerance. This structure can determine whether the new-target workpiece 41 is acceptable, without inspecting the workpiece 41 using the measurement device 30. Any insufficient cutting by the tool with wear can be further compensated for by tool length (coordinate) compensation to allow acceptable machining for a prolonged period of time.

The notifier 19 provides, based on the history of the predicted dimension, information about the number of times of machining expected to be performed before the machining dimension falls out of the tolerance. This informs the user of the timing to replace the tool and prepare a new tool in advance.

In the example described above, the features are calculated for the sections defined by shifting a section with a fixed length. However, the example is not limited to this. For example, the feature calculator 14 may calculate the features for each section resulting from dividing the machining period. The sections A1 to A18 in the example of FIG. 7 may result from equally dividing the machining period into 18 sections. The machining period may be divided into a preset number of sections, or may be divided into sections each having a length close to a predetermined length. This structure can also reduce the computational load for calculating the features.

Embodiment 2

Embodiment 2 is described focusing on the differences from Embodiment 1. The components that are the same as or similar to those in Embodiment 1 are given the same reference signs and are not described or are described briefly. The present embodiment differs from Embodiment 1 in that each section for calculating the features is a combination of multiple subsections included in the machining period.

Figure 15:
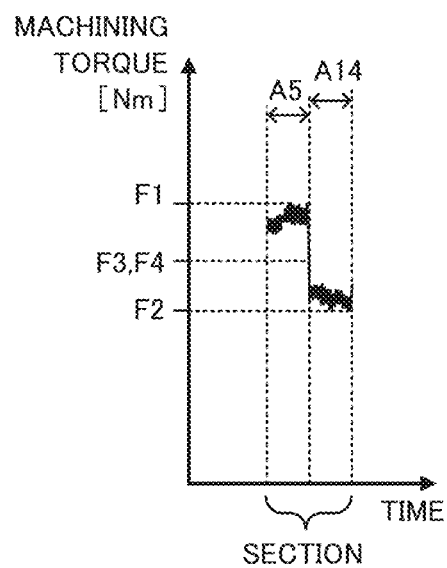
FIG. 15 is a graph describing calculation of features in Embodiment 2.

In the present embodiment, the sections A1 to A18 illustrated in FIG. 7 in Embodiment 1 are referred to as subsections. Two of these subsections are combined into a section, and the feature calculator 14 calculates the features using the waveform in this section. More specifically, as illustrated in FIG. 15, the subsections corresponding to the sections A5 and A14 in Embodiment 1 are combined into a section, and the features F1 to F4 are calculated using the combined waveform in this section. As illustrated in FIG. 16, the feature calculator 14 calculates the features for the sections being all the combinations of subsections.

As described above, the section in the present embodiment corresponds to a period resulting from combining a first subsection included in the machining period and a second subsection starting at a time later than an end time of the first subsection. When two portions are to be measured by the measurement device 30 after being machined by the machining tool 20, such as the length D2 in FIG. 3, the feature can be more relevant to the measurement value when the feature is calculated using the waveform resulting from combining the waveforms in the two subsections including the timing at which machining is performed on these portions than when the feature is calculated using the waveforms in the individual subsections. The structure can thus provide a more appropriate feature for predicting the machining dimension.

Embodiment 3

Embodiment 3 is described focusing on the differences from Embodiment 1. The components that are the same as or similar to those in Embodiment 1 are given the same reference signs and are not described or are described briefly. The machining dimension is affected by ambient temperature. Thus, a prediction model appropriate for summer may be used in summer, and a prediction model appropriate for winter may be used in winter, for example, rather than a common prediction model for summer and winter being used. In the present embodiment, the prediction model is trained with data acquired when a specific condition is satisfied, and the prediction model is used to predict the machining dimension of the new-target workpiece 41 when the condition is satisfied.

Figure 17:
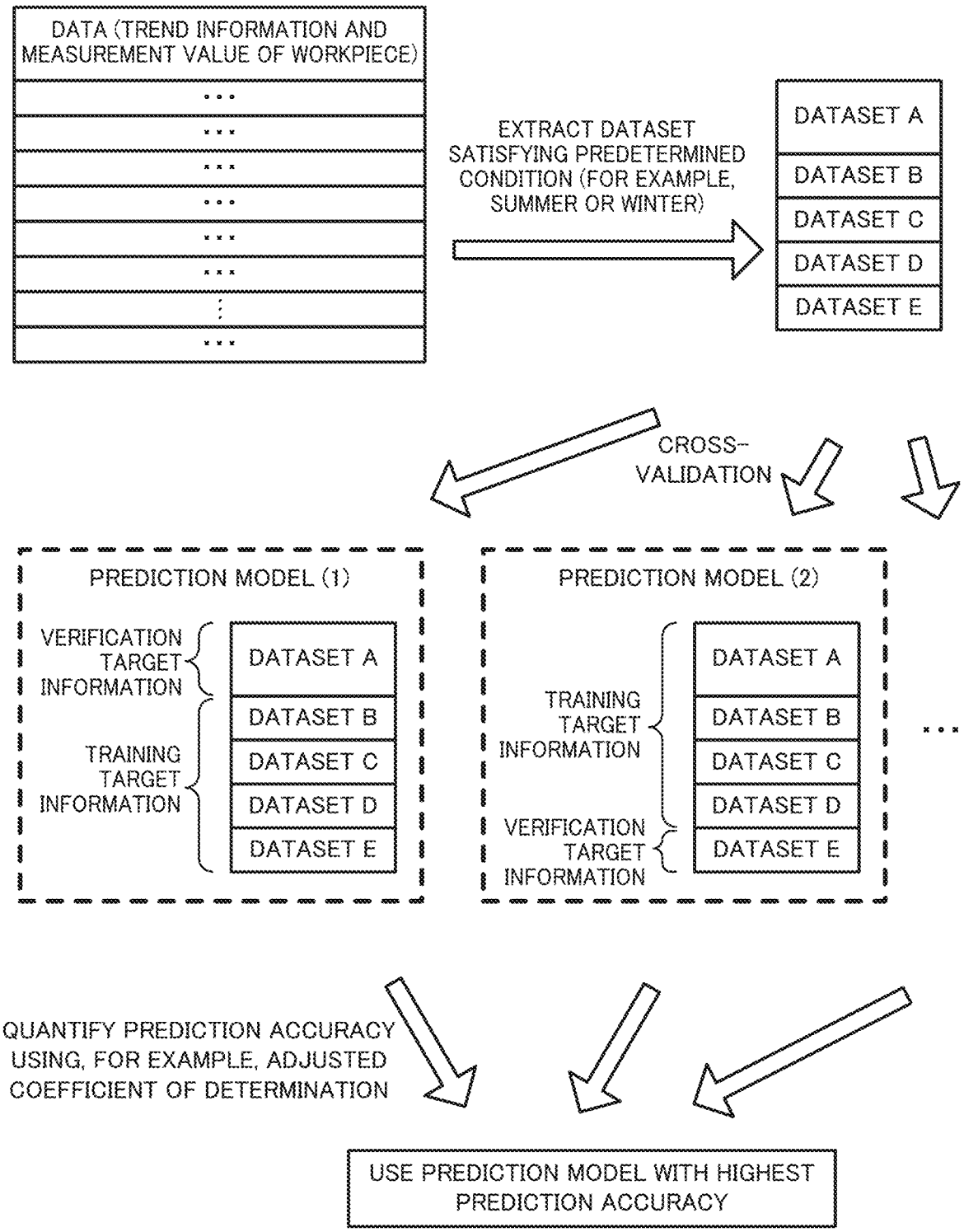
FIG. 17 is a diagram describing training of a prediction model in Embodiment 3.

As illustrated in FIG. 17, the machining dimension prediction apparatus 10 collects a large volume of data. Each individual piece of data corresponds to the trend information and the measurement value of the workpiece 40 of the same type. The trainer 17 extracts a dataset satisfying a predetermined condition from the large volume of data and performs cross-validation on the extracted data More specifically, the trainer 17 divides the extracted information into verification target information for the verification process and training target information for the training process, and generates multiple prediction models by changing the target dataset. The trainer 17 quantifies and evaluates the prediction accuracy using, for example, the adjusted coefficient of determination, and determines the prediction model having the highest prediction accuracy. For example, the trainer 17 extracts the dataset satisfying a condition from summer period data, and determines the prediction model for summer having the highest prediction accuracy. Similarly, the trainer 17 extracts the dataset satisfying a condition from winter period data, and determines the prediction model for winter having the highest prediction accuracy. Under the environmental condition of winter, for example, the winter prediction model appropriate for winter and having high prediction accuracy can be selected and used for machining.

The machining dimension prediction apparatus 10 extracts data and performs cross-validation also for another condition and acquires a prediction model appropriate for the other condition. For example, the machining dimension prediction apparatus 10 acquires a prediction model appropriate for daytime with a larger amplitude of ground vibration and a prediction model appropriate for nighttime with a smaller amplitude of ground vibration. When the condition under which the prediction accuracy is verified as illustrated in FIG. 17 is satisfied for the new-target workpiece 41, the predictor 18 uses the prediction model appropriate for the condition to estimate the machining dimension of the new-target workpiece 41.

As described above, the machining dimension prediction apparatus 10 acquires a prediction model appropriate for the condition. This allows accurate prediction of the machining dimension of the new-target workpiece 41 when the condition is satisfied.

The trainer 17 in the present embodiment corresponds to an example of training means for repeatedly extracting, from trend information satisfying a predetermined condition in the trend information acquired for each workpiece, training target information for training and verification target information other than information for training while changing the training target information in the trend information, and repeatedly verifying, based on the verification target information and on the measurement values of workpieces corresponding to the verification target information in the trend information, the prediction accuracy with the second prediction model trained with the training target information. The predictor 18 corresponds to an example of prediction means for predicting, when the above condition is satisfied, the dimension of the new-target workpiece using the second prediction model trained with the training target information.

Embodiment 4

Embodiment 4 is described focusing on the differences from Embodiment 1. The components that are the same as or similar to those in Embodiment 1 are given the same reference signs and are not described or are described briefly. The present embodiment differs from Embodiment 1 in that an index value different from the coefficient of correlation with the measurement value is used as the degree of relevance.

Figure 18:
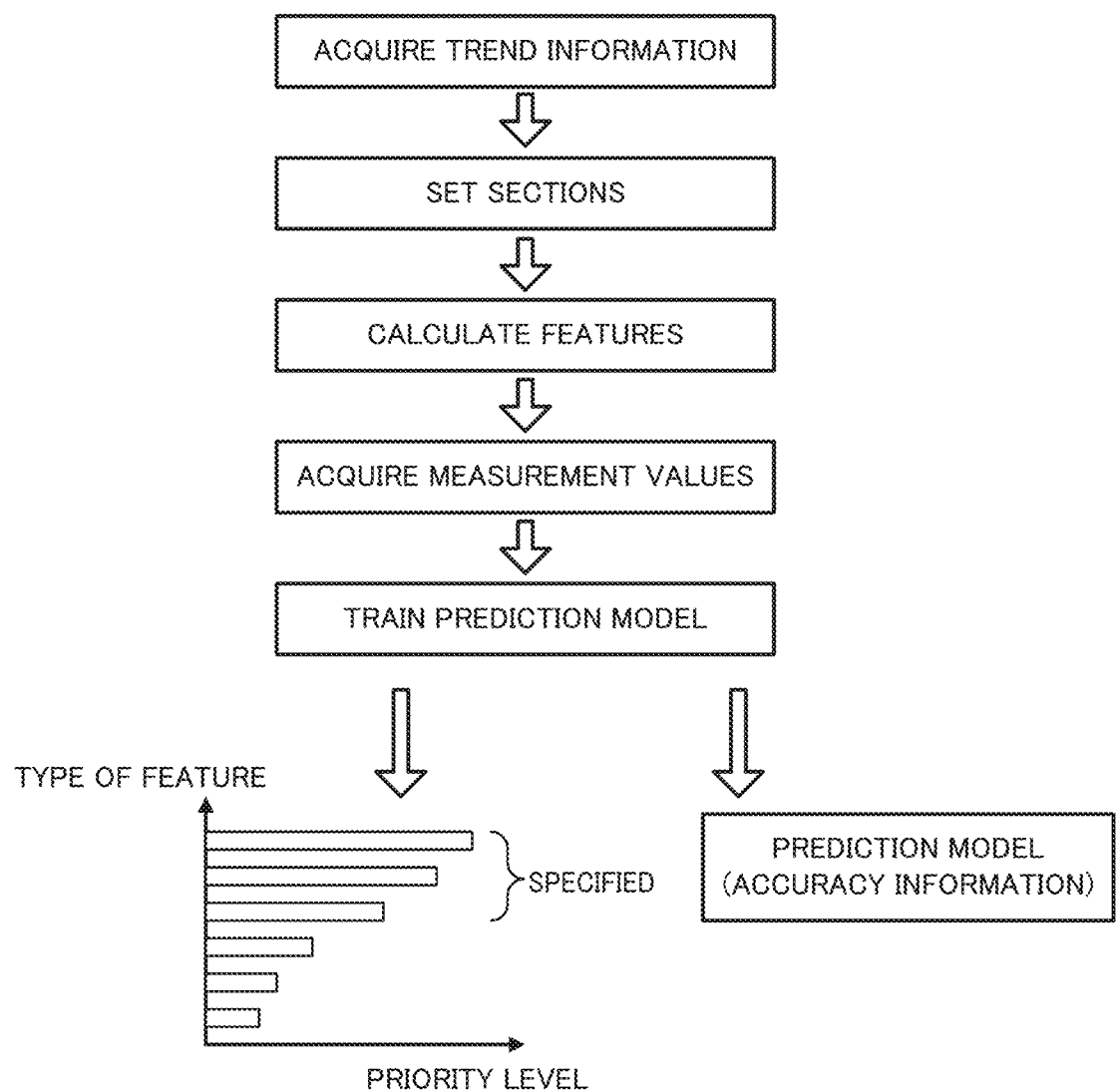
FIG. 18 is a diagram describing a priority level in Embodiment 4.

FIG. 18 is a schematic diagram illustrating derivation of the degree of relevance in the present embodiment. As illustrated in FIG. 18, the trend acquirer 11 acquires the trend information, the feature calculator 14 sets the sections and calculates the features of all types, and the measurement value acquirer 15 acquires the measurement values, similarly to steps S11 to S14 in FIG. 12.

The section specifier 16 then trains a measurement-value prediction model for predicting the measurement value using the sections and the types of features as explanatory variables and using the measurement value as an objective variable. For example, the section specifier 16 uses a gradient boosting tree to train the measurement-value prediction model. The measurement-value prediction model can be trained to determine, for each section and for each type of feature, the priority level for the measurement value, or the degree of contribution to the measurement value. In other words, the priority level is the degree to which each section and each type of feature are relevant to the measurement value. The section specifier 16 specifies the sections and the types of features in descending order of the priority level. The section specifier 16 may specify at least the section having the greatest priority level and the type of feature having the greatest priority level.

As described above, in this embodiment, the priority level in the measurement-value prediction model is used as the degree of relevance to specify the types of features. The prediction model thus allows highly accurate prediction of the machining dimension. The section specifier 16 corresponds to an example of the section specifying means for training a first prediction model to predict the measurement value based on the multiple types of features using the multiple types of features as explanatory variables and using the measurement value as an objective variable, and specifying, as the type of feature having the greatest degree of relevance, the type of feature having the greatest priority level in the trained first prediction model.

In the example described above, both the sections and the types of features are used as explanatory variables. However, the example is not limited to this. For example, the features of all types calculated in the entire machining period may be used as explanatory variables, and the measurement value may be used as an objective variable. The types of features having greater priority levels may be specified first, and then the sections having greater coefficients of correlation between the features of the specified types and the measurement value may be specified.

Embodiment 5

Embodiment 5 is described focusing on the differences from Embodiment 1. The components that are the same as or similar to those in Embodiment 1 are given the same reference signs and are not described or are described briefly. The present embodiment differs from Embodiment 1 in that an index value different from the coefficient of correlation with the measurement value is used as the degree of relevance.

Figure 19:
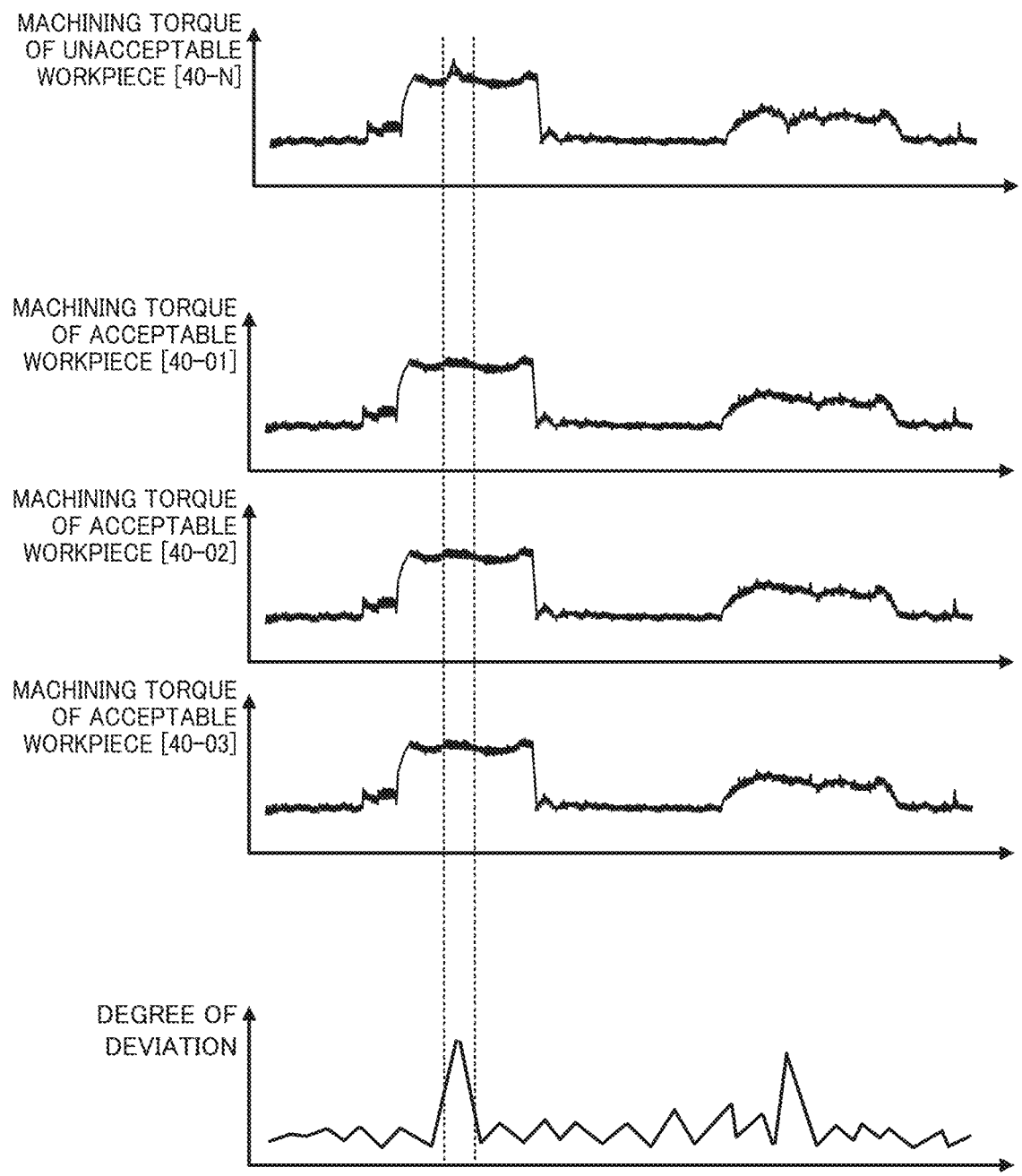
FIG. 19 is a graph describing a degree of deviation in Embodiment 5.

FIG. 19 illustrates a section in which a workpiece 40 determined unacceptable has the state trend largely deviating from the state trends of workpieces 40 determined acceptable. This section is highly relevant to the measurement value used for determining whether the workpiece is acceptable. Thus, the section specifier 16 in the present embodiment specifies, as the sections with great degrees of relevance, multiple sections in descending order of the degree of deviation. The degree of deviation is the degree to which the trend of the state of the machining tool 20 for the workpiece 40 machined defectively deviates from the trend of the state of the machining tool 20 for the workpiece 40 machined normally. The degree of deviation may be indicated by, for example, the localized matrix profile (LMP) feature described in Non Patent Literature 1 above. A greater LMP feature indicates a greater difference in the waveform at the time.

In the embodiment described above, the degree of deviation is used as the degree of relevance. The section having a greater degree of deviation between the unacceptable workpiece and the acceptable workpiece is selected. The section is thus specified appropriately to allow the prediction model to be accurate. Although the section is specified based on the degree of deviation in the present embodiment, the type of feature may be specified based on another index value after the section is specified.

The degree of relevance may be other than the coefficient of correlation, the priority level in Embodiment 4, or the degree of deviation in Embodiment 5. For example, the degree of relevance may be the independence criterion or the mutual information of the feature and the measurement value.

Embodiment 6

Embodiment 6 is described focusing on the differences from Embodiment 1. The components that are the same as or similar to those in Embodiment 1 are given the same reference signs and are not described or are described briefly. The present embodiment differs from Embodiment 1 in that the sections are set with variable widths.

Figure 20:
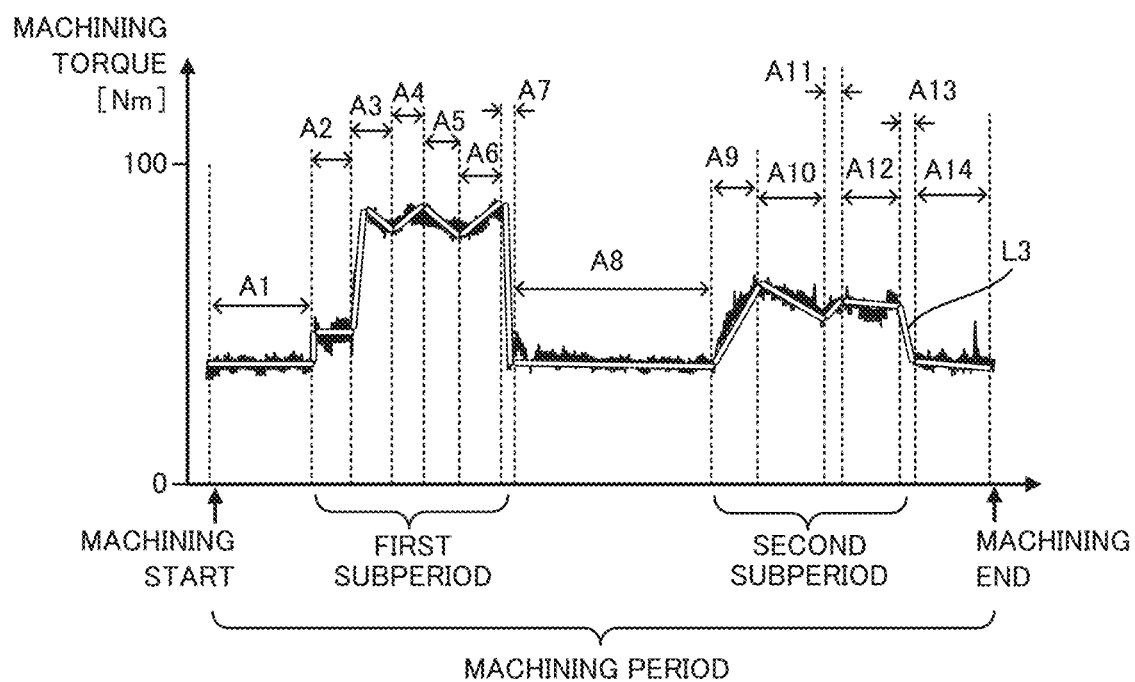
FIG. 20 is a first graph describing setting of sections in Embodiment 6.

As illustrated in FIG. 20, the feature calculator 14 in the present embodiment calculates the features in the sections corresponding to the line segments included in a polygonal line L3 approximating the waveform representing the trend of the state of the machining tool 20. Examples of the polygonal approximation include the Ramer-Douglas-Peucker algorithm.

Sections can be set with variable lengths appropriate for the waveform. The section having a great degree of relevance to the measurement value can be specified.

Figure 21:
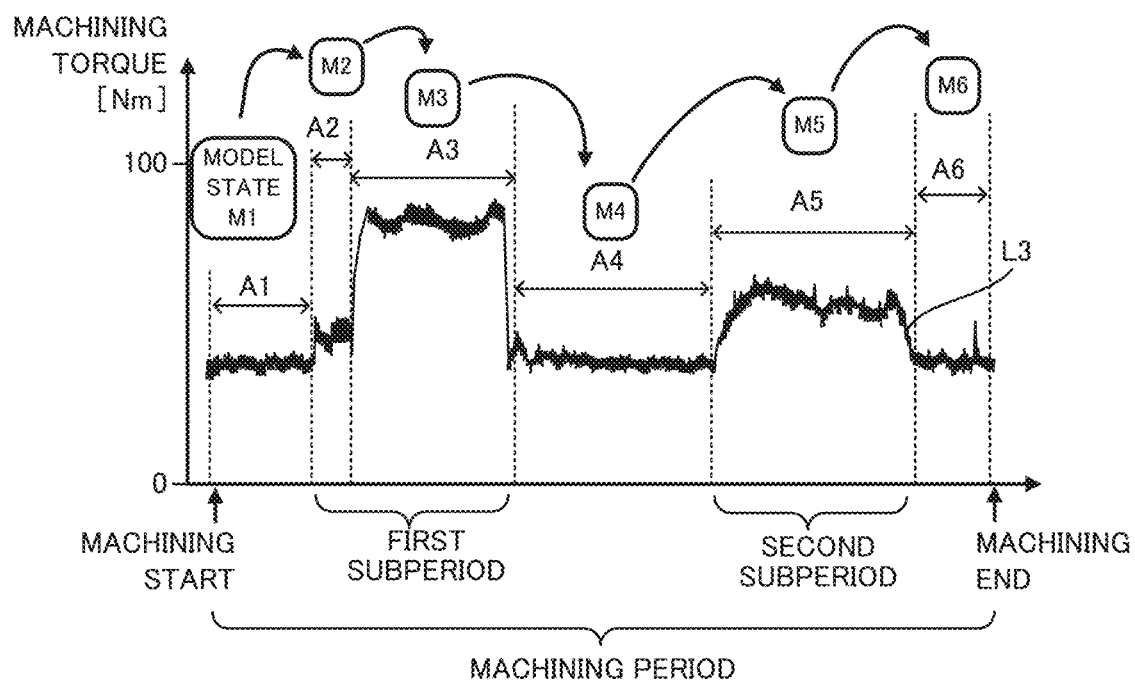
FIG. 21 is a second graph describing setting of sections in Embodiment 6.

The method for setting the variable-width sections is not limited to the polygonal approximation. For example, as illustrated in FIG. 21, the section definer 13 may use a predetermined state-transition model for the trend of the state to predict transition between model states corresponding to the waveform, and may set sections corresponding to the respective model states. The state-transition model may use, for example, the method described in International Publication No. WO 2020/234961 or use hidden Markov chains.

Although one or more embodiments of the present disclosure have been described above, the present disclosure is not limited to the above embodiments.

In the above embodiments, for example, the machining dimension prediction apparatus 10 acquires the trend information and the measurement value through communication. However, the machining dimension prediction apparatus 10 may acquire the trend information and the measurement value by loading data from the auxiliary storage 53 or from a location in an external server specified by the user.

In the above embodiments, the state of the machining tool 20 is represented by a series of scalar values. However, the state may be represented by a series of vector values.

The feature may be other than the features described in the above embodiments. The feature may be the difference value between the immediately preceding measurement value and the current measurement value, or may be the position deviation. The feature calculator 14 may calculate, as the features, the integral value corresponding to the area between the waveform and the horizontal axis in the section in FIG. 8, and the variance value based on the feature F3. In some embodiments, the feature calculator 14 may calculate an arithmetic feature other than the difference value, the integral value, or the variance value.

In the above embodiments, the section specifier 16 specifies the type of feature having the greatest degree of relevance. However, the section specifier 16 may use any other method to specify one of multiple types of features. For example, multiple prediction models may be trained using one or more combinations selected by the user from the combinations of features and sections having degrees of relevance (or coefficients of correlation) greater than or equal to 0.4. Of the trained prediction models, the model having the smallest residual in the verification process may be used for the prediction process to select the type of feature.

Figure 22:
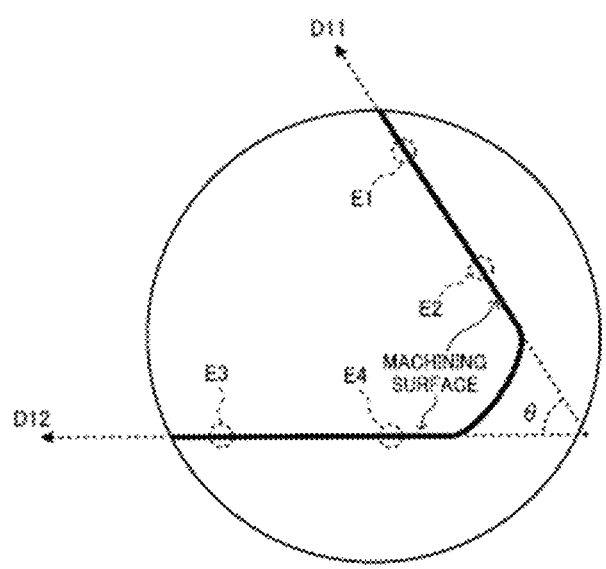
FIG. 22 is a diagram of a measurement portion in a modification.

In the above embodiments, one or two portions of the workpiece 40 are to be measured by the measurement device 30 after being machined by the machining tool 20. However, the example is not limited to this. When the measurement target is an angle as illustrated in FIG. 22, for example, the dimension may be measured using four measurement portions E1, E2, E3, and E4. The measurement portions E1 and E2 define a reference direction D11. The measurement portions E3 and E4 define a direction D12 that forms an angle θ with the direction D11. In this example, four sections may be specified.

The functions of the machining dimension prediction apparatus 10 can be implemented by dedicated hardware or a general-purpose computer system.

For example, the program P1 executable by the processor 51 may be stored in a non-transitory computer-readable recording medium for distribution. The program P1 is installed in a computer to provide a device that performs the above processing. Examples of such non-transitory recording media include a flexible disk, a compact disc read-only memory (CD-ROM), a digital versatile disc (DVD), and a magneto-optical (MO) disk.

The program P1 may be stored in a disk device included in a server on a communication network, such as the Internet, and may be, for example, superimposed on a carrier wave to be downloaded to a computer.

The above processing may also be performed by the program P1 activated and executed while being transferred through a communication network.

The above processing may be performed by entirely or partially executing the program P1 on a server while a computer is transmitting and receiving information about the processing through a communication network.

In the system with the above functions implementable partially by the operating system (OS) or through cooperation between the OS and applications, portions executable by applications other than the OS may be stored in a non-transitory recording medium that may be distributed or may be downloaded to a computer.

Means for implementing the functions of the machining dimension prediction apparatus 10 is not limited to software. The functions may be partially or entirely implemented by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure may be used for predicting the dimensions of workpieces machined by machining tools.

REFERENCE SIGNS LIST

100 Machining dimension prediction system
10 Machining dimension prediction apparatus 11 Trend acquirer
12 Type-number acquirer
13 Section definer
14 Feature calculator
15 Measurement value acquirer
16 Section specifier
17 Trainer
18 Predictor
19 Notifier
191 Tool length compensator
20 Machining tool
201 Tool
21 Sensor
30 Measurement device
40, 41 Workpiece
401 Inward-facing surface
402 Outward-facing surface
51 Processor
52 Main storage
53 Auxiliary storage
54 Input device
55 Output device
56 Communicator
57 Internal bus
A1 to A18 Section
L1, L3 Line
L10 Regression line
P1 Program

The invention claimed is:

1. A machining dimension prediction apparatus, comprising:
processing circuitry
to acquire trend information for each of a plurality of workpieces on which machining is performed, the trend information indicating a trend of a state of a machining tool during a machining period from a start to an end of the machining performed by the machining tool,
to calculate, based on the trend information, a feature using the trend of the state in each of a plurality of sections included in the machining period,
to acquire a measurement value of a dimension of each of the plurality of workpieces after being machined,
to specify, as a specific section of the plurality of sections, a section including a calculated feature having a degree of relevance being greatest, the degree of relevance being a degree of relevance to the measurement value, and
to predict, when a new-target workpiece is machined, a dimension of the new-target workpiece after being machined based on the feature calculated using the trend of the state in the specific section.

2. The machining dimension prediction apparatus according to claim 1, wherein
each of the plurality of sections corresponds to a period resulting from combining a first subsection included in the machining period and a second subsection starting at a time later than an end time of the first subsection.

3. The machining dimension prediction apparatus according to claim 1, wherein
the processing circuitry specifies, as specific sections, two or more of the plurality of sections in descending order of the degree of relevance.

4. The machining dimension prediction apparatus according to claim 1, wherein
the processing circuitry calculates, based on the trend information, a plurality of types of the features using the trend of the state in each of the plurality of sections included in the machining period,
the processing circuitry specifies a type of feature of the plurality of types of features having the greatest degree of relevance, and specifies, as the specific section, a section including the calculated feature having the greatest degree of relevance, and
when the new-target workpiece is machined, the processing circuitry predicts the dimension of the new-target workpiece after being machined based on the feature of the specified type and calculated using the trend of the state in the specified specific section together with the type of feature.

5. The machining dimension prediction apparatus according to claim 4, wherein
the processing circuitry specifies two or more combinations of the specific sections and the types of features in descending order of the degree of relevance.

6. The machining dimension prediction apparatus according to claim 4, wherein
the processing circuitry trains a first prediction model to predict the measurement value based on the plurality of types of features, using the plurality of types of features as explanatory variables and using the measurement value as an objective variable, and specifies, as the type of feature having the greatest degree of relevance, a type of feature having a greatest priority level in the trained first prediction model.

7. The machining dimension prediction apparatus according to claim 1, wherein
the processing circuitry specifies, as the specific section, a section having a greatest coefficient of correlation with the measurement value.

8. The machining dimension prediction apparatus according to claim 1, wherein
the processing circuitry specifies, as the specific section, a section having a degree of deviation being greatest, the degree of deviation being a degree to which the trend of the state for a workpiece machined defectively deviates from the trend of the state for a workpiece machined normally.

9. The machining dimension prediction apparatus according to claim 1, wherein
the processing circuitry calculates the feature for every shifting of a section with a predetermined length within the machining period.

10. The machining dimension prediction apparatus according to claim 1, wherein
the processing circuitry calculates the feature in each of the plurality of sections resulting from dividing the machining period.

11. The machining dimension prediction apparatus according to claim 1, wherein
the processing circuitry calculates the feature in each of the plurality of sections corresponding to line segments included in a polygonal line approximating a waveform representing the trend of the state.

12. The machining dimension prediction apparatus according to claim 1, wherein
the processing circuitry calculates the feature using, in transition between model states predicted by using a predetermined state-transition model for the trend of the state, the trend of the state in each of the plurality of sections corresponding to the respective model states.

13. The machining dimension prediction apparatus according to claim 1, wherein the processing circuitry trains a second prediction model to predict a dimension of a workpiece based on the feature corresponding to the specific section, and the processing circuitry predicts the dimension of the new-target workpiece after being machined using the trained second prediction model.

14. The machining dimension prediction apparatus according to claim 13, wherein the processing circuitry repeatedly extracts, from trend information satisfying a predetermined condition in the trend information acquired for each of the plurality of workpieces, training target information being information for training and verification target information other than the information for training, while changing the training target information in the trend information, the processing circuitry repeatedly verifies, based on the verification target information and on the measurement value of a workpiece corresponding to the verification target information in the trend information, prediction accuracy with the second prediction model trained with the training target information, and the processing circuitry predicts, when the predetermined condition is satisfied, the dimension of the new-target workpiece using the second prediction model trained with the training target information.

15. The machining dimension prediction apparatus according to claim 1, further comprising:

notification circuitry to provide, when the predicted dimension is out of a predetermined tolerance, a notification indicating that the dimension is out of the predetermined tolerance.

16. The machining dimension prediction apparatus according to claim 15, wherein the notification circuitry provides, based on history of the predicted dimension, information about a number of times of machining expected to be performed before the dimension resulting from the machining falls out of the predetermined tolerance.

17. The machining dimension prediction apparatus according to claim 15, wherein the processing circuitry compensates for, when the predicted dimension is out of the predetermined tolerance, a tool length set for the machining tool to machine a workpiece.

18. A machining dimension prediction system, comprising:

the machining dimension prediction apparatus according to claim 1; and a measurement device to measure a dimension of a workpiece.

19. A machining dimension prediction method, comprising:

calculating a feature using a trend of a state of a machining tool in each of a plurality of sections included in a machining period from a start to an end of machining for each of a plurality of workpieces on which the machining is performed by the machining tool;

specifying, from the plurality of sections, a section including a calculated feature having a degree of relevance being greatest, the degree of relevance being a degree of relevance to a measurement value of a dimension of each of the plurality of workpieces; and predicting, when a new-target workpiece is machined, a dimension of the new-target workpiece based on the feature calculated using the trend of the state in the specified section.

20. A non-transitory computer-readable recording medium storing a program, the program causing a computer to perform operations comprising:

calculating a feature using a trend of a state of a machining tool in each of a plurality of sections included in a machining period from a start to an end of machining for each of a plurality of workpieces on which the machining is performed by the machining tool;

specifying, from the plurality of sections, a section including a calculated feature having a degree of relevance being greatest, the degree of relevance being a degree of relevance to a measurement value of a dimension of each of the plurality of workpieces; and predicting, when a new-target workpiece is machined, a dimension of the new-target workpiece based on the feature calculated using the trend of the state in the specified section.

* * * * *